United States Patent
Gonzalez Aguirre et al.

(10) Patent No.: US 11,814,052 B2
(45) Date of Patent: *Nov. 14, 2023

(54) SAFETY SYSTEM FOR A VEHICLE

(71) Applicant: Mobileye Vision Technologies Ltd., Jerusalem (IL)

(72) Inventors: David Israel Gonzalez Aguirre, Portland, OR (US); Ignacio Alvarez, Portland, OR (US); Maria Soledad Elli, Hillsboro, OR (US); Javier Felip Leon, Hillsboro, OR (US); Javier Turek, Beaverton, OR (US)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,044

(22) Filed: Sep. 9, 2022

(65) Prior Publication Data

US 2023/0077618 A1   Mar. 16, 2023

Related U.S. Application Data

(63) Continuation of application No. 16/830,413, filed on Mar. 26, 2020, now Pat. No. 11,472,414.

(51) Int. Cl.
*B60W 40/08* (2012.01)
*B60W 40/068* (2012.01)
(Continued)

(52) U.S. Cl.
CPC .......... *B60W 40/068* (2013.01); *B60W 40/10* (2013.01); *B60W 50/0097* (2013.01);
(Continued)

(58) Field of Classification Search
CPC ............... B60W 40/068; B60W 40/10; B60W 50/0097; B60W 2552/40; B60W 2552/35; B60W 2554/4044; B60W 2554/802; B60W 2554/801; B60W 2520/06; B60W 2520/105; B60W 2520/125;
(Continued)

(56) References Cited

U.S. PATENT DOCUMENTS 10,275,662 B1 *   4/2019   Askeland ................ G06V 20/56
2011/0282627 A1 *   11/2011   Jang ...................... G08G 1/0112
702/179

(Continued)

*Primary Examiner* — Peter D Nolan
*Assistant Examiner* — Wae L Louie
(74) *Attorney, Agent, or Firm* — FINNEGAN, HENDERSON, FARABOW, GARRETT & DUNNER LLP

(57) ABSTRACT

A safety system for a vehicle may include one or more processors configured to determine, based on a friction prediction model, one or more predictive friction coefficients between the ground and one or more tires of the ground vehicle using first ground condition data and second ground condition data. The first ground condition data represent conditions of the ground at or near the position of the ground vehicle, and the second ground condition data represent conditions of the ground in front of the ground vehicle with respect to a driving direction of the ground vehicle. The one or more processors are further configured to determine driving conditions of the ground vehicle using the determined one or more predictive friction coefficients.

18 Claims, 17 Drawing Sheets

(51) Int. Cl.
*B60W 40/10* (2012.01)
*B60W 50/00* (2006.01)
*G05D 1/00* (2006.01)

(52) U.S. Cl.
CPC . *B60W 2050/0031* (2013.01); *B60W 2420/42* (2013.01); *B60W 2520/06* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60W 2552/35* (2020.02); *B60W 2552/40* (2020.02); *B60W 2554/4044* (2020.02); *B60W 2554/801* (2020.02); *B60W 2554/802* (2020.02); *B60W 2555/20* (2020.02); *G05D 1/0088* (2013.01)

(58) Field of Classification Search
CPC ......... B60W 2520/14; B60W 2520/16; B60W 2520/18; B60W 2420/42; G05D 1/0088
See application file for complete search history.

(56) References Cited

U.S. PATENT DOCUMENTS

| | | | |
|---|---|---|---|
| 2017/0267220 A1* | 9/2017 | Serra | F16D 65/092 |
| 2018/0217050 A1* | 8/2018 | Heil | B60T 8/172 |
| 2019/0138848 A1* | 5/2019 | Gonzalez Aguirre | G06V 10/772 |
| 2019/0256103 A1* | 8/2019 | Capua | B60W 40/101 |
| 2020/0033137 A1* | 1/2020 | Hartmann | G01C 21/3848 |
| 2020/0207357 A1* | 7/2020 | McCormick | B60W 10/18 |
| 2020/0223443 A1* | 7/2020 | Gonzalez Aguirre | B60W 60/0015 |
| 2021/0086769 A1* | 3/2021 | Vandenbussche | B60W 10/04 |
| 2021/0188284 A1* | 6/2021 | Hassel | B60W 10/20 |
| 2021/0206379 A1* | 7/2021 | Bobier-Tiu | G06T 17/10 |

* cited by examiner

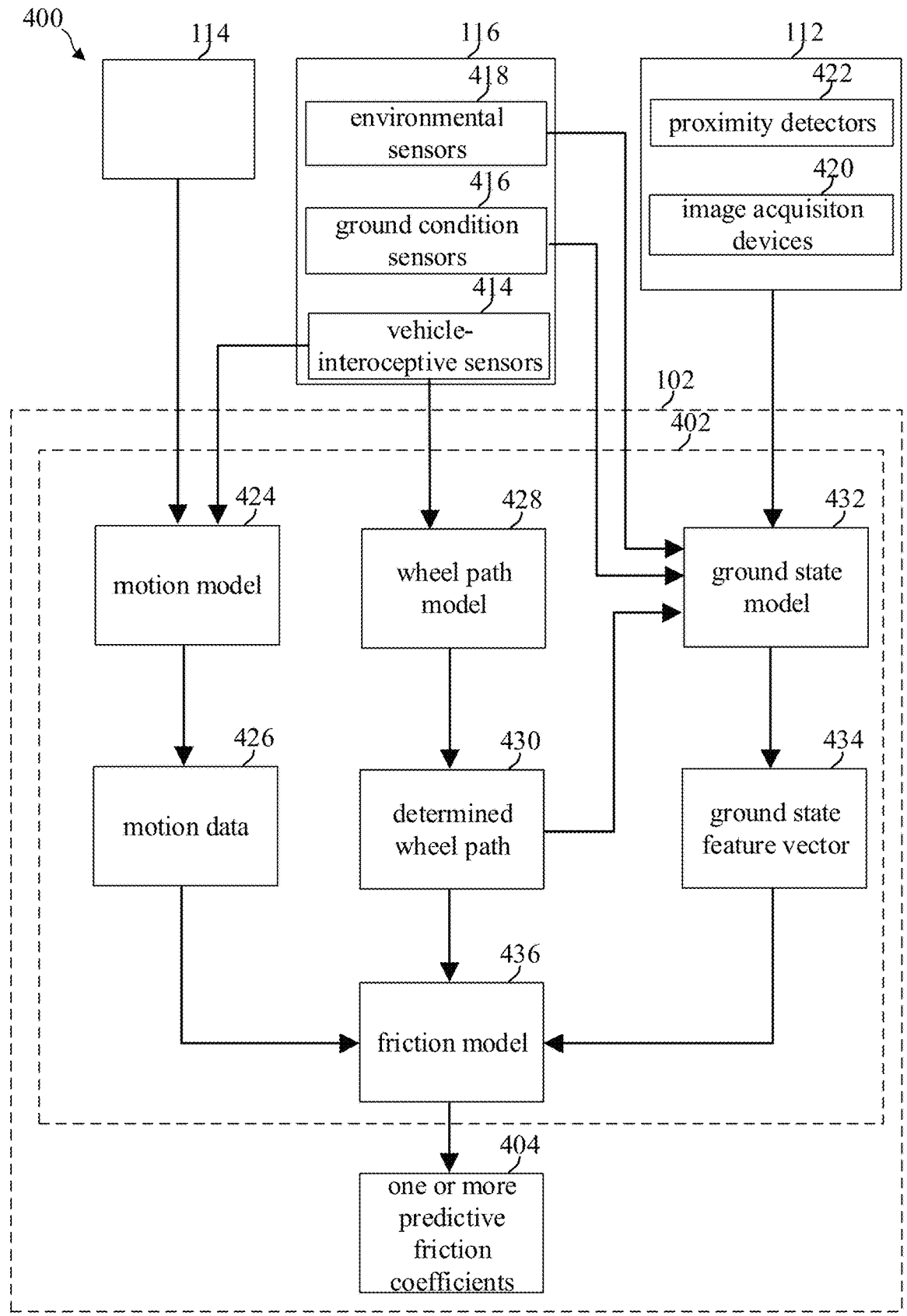

SAFETY SYSTEM FOR A VEHICLE

CROSS-REFERENCE TO RELATED APPLICATIONS

This is a continuation of U.S. Non-Provisional application Ser. No. 16/830,413, which was filed on Mar. 26, 2020, the entire contents of which are incorporated herein by reference.

TECHNICAL FIELD

Various aspects of this disclosure generally relate to autonomous driving systems.

BACKGROUND

Autonomous driving systems often utilize data acquired at a vehicle. By using data acquired at the vehicle, which may include data about the vehicle's environment or data about the vehicle itself, the vehicle may alter its movements, modify its positioning with respect to external elements, and respond to newly detected events. Additionally, autonomous vehicles may be configured to communicate with other devices in order to improve overall system performance.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 4A to FIG. 4H show examples of a processing system with predictive friction determination in accordance with various aspects of the disclosure;

DESCRIPTION

Figure 1:
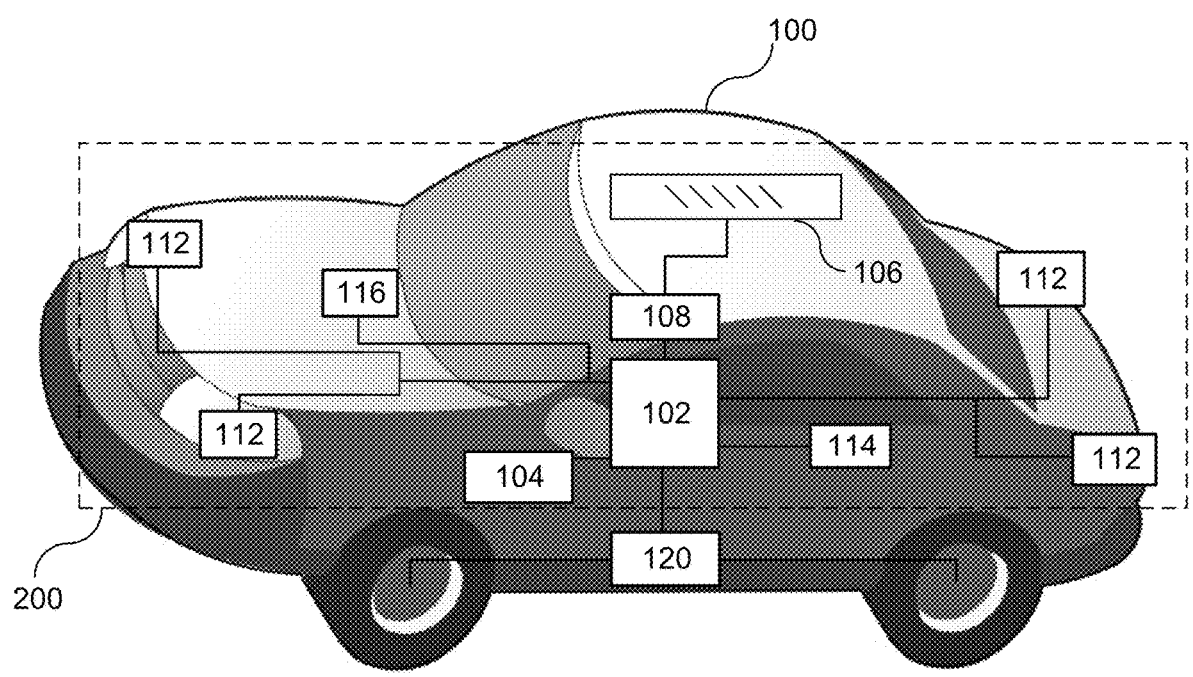
FIG. 1 shows an exemplary autonomous vehicle in accordance with various aspects of the disclosure.

The following detailed description refers to the accompanying drawings that show, by way of illustration, exemplary details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of being maneuvers on or below the surface of liquid, e.g., a boat on the surface of water or a submarine below the surface. It is appreciated that some vehicles may be configured to operate as one of more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (e.g., fully operational with driver input or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle, such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data, among others. A classification model as described herein may, for example, classify certain driving conditions and/or environmental conditions, such as weather conditions, road conditions, among others. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, among others. The neural network may include any number of layers. The training of the neural network (e.g., adapting the layers of the neural network) may use or may be based on any kind of training principle, such as backpropagation (e.g., using the backpropagation algorithm).

Throughout the disclosure, the following terms may be used as synonyms: data, sensor data, sensor information, detected information, measured information, parameter. These terms may correspond to groups of values used to implement one or more models for directing a vehicle to operate according to the manners described herein.

Furthermore, throughout the disclosure, the following terms may be used as synonyms: path, wheel path, predicted path, predicted wheel path, determined path, determined wheel path, expected wheel path, estimated wheel path, and may correspond to specific values determined via a model.

Furthermore, throughout the disclosure, the following terms may be used as synonyms: predicted friction coefficient, estimated friction coefficient, friction coefficient predicted for, and may correspond to specific values determined via a model.

Furthermore, throughout the disclosure, the following terms may be used as synonyms: feature vector, low-dimensional representation, latent space, latent space representation, reduced space representation, and may correspond to specific values determined via a model.

Furthermore, throughout the disclosure, the following terms may be used as synonyms: driving conditions, driving parameter, driving-related parameter, conditions, and may correspond to specific values related to a vehicle.

Furthermore, throughout the disclosure, the terms control system and safety system may be used as synonyms.

In order to control an autonomous vehicle, it may be advantageous to determine safety-related parameters, such as a safety distance to another vehicle, in real-time or in a predictive manner. To determine the safety-related parameters, it may be advantageous to determine driving-related parameters, such as friction coefficients between the tires of the vehicle and the ground. According to various aspects of the disclosure, a safety system is provided, which is capable to determine a predictive friction coefficient in front of the vehicle and the control of the autonomous vehicle may be adjusted based on the predicted friction coefficient. For example, the safety system may, in at least one aspect, determine a predicted reduced safety distance to another vehicle and the autonomous vehicle may slow down based on the predicted reduced safety distance.

FIG. 1 shows a vehicle 100 including a mobility system 120 and a control system 200 (see also FIG. 2) in accordance with various aspects of the disclosure. It is appreciated that vehicle 100 and control system 200 are exemplary in nature and may thus be simplified for explanatory purposes. For example, while vehicle 100 is depicted as a ground vehicle, aspects of this disclosure may be equally or analogously applied to aerial vehicles (such as drones) or aquatic vehicles (such as boats). Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels. The vehicular housing, such as, an automobile body, drone body, plane or helicopter fuselage, boat hull, or similar type of vehicular body is dependent on the type of vehicle implemented as vehicle 100.

In addition to including a control system 200, vehicle 100 may also include a mobility system 120. Mobility system 120 may include components of vehicle 100 related to steering and movement of vehicle 100. In some aspects, where vehicle 100 is an automobile, for example, mobility system 120 may include wheels and axles, a suspension, an engine, a transmission, brakes, a steering wheel, associated electrical circuitry and wiring, and any other components used in the driving of an automobile. In some aspects, where vehicle 100 is an aerial vehicle, mobility system 120 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 100 is an aquatic or sub-aquatic vehicle, mobility system 120 may include any one or more of rudders, engines, propellers, a steering wheel, associated electrical circuitry and wiring, and any other components used in the steering or movement of an aquatic vehicle. In some aspects, mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components that perform decisions and/or computations related to autonomous driving.

Figure 2:
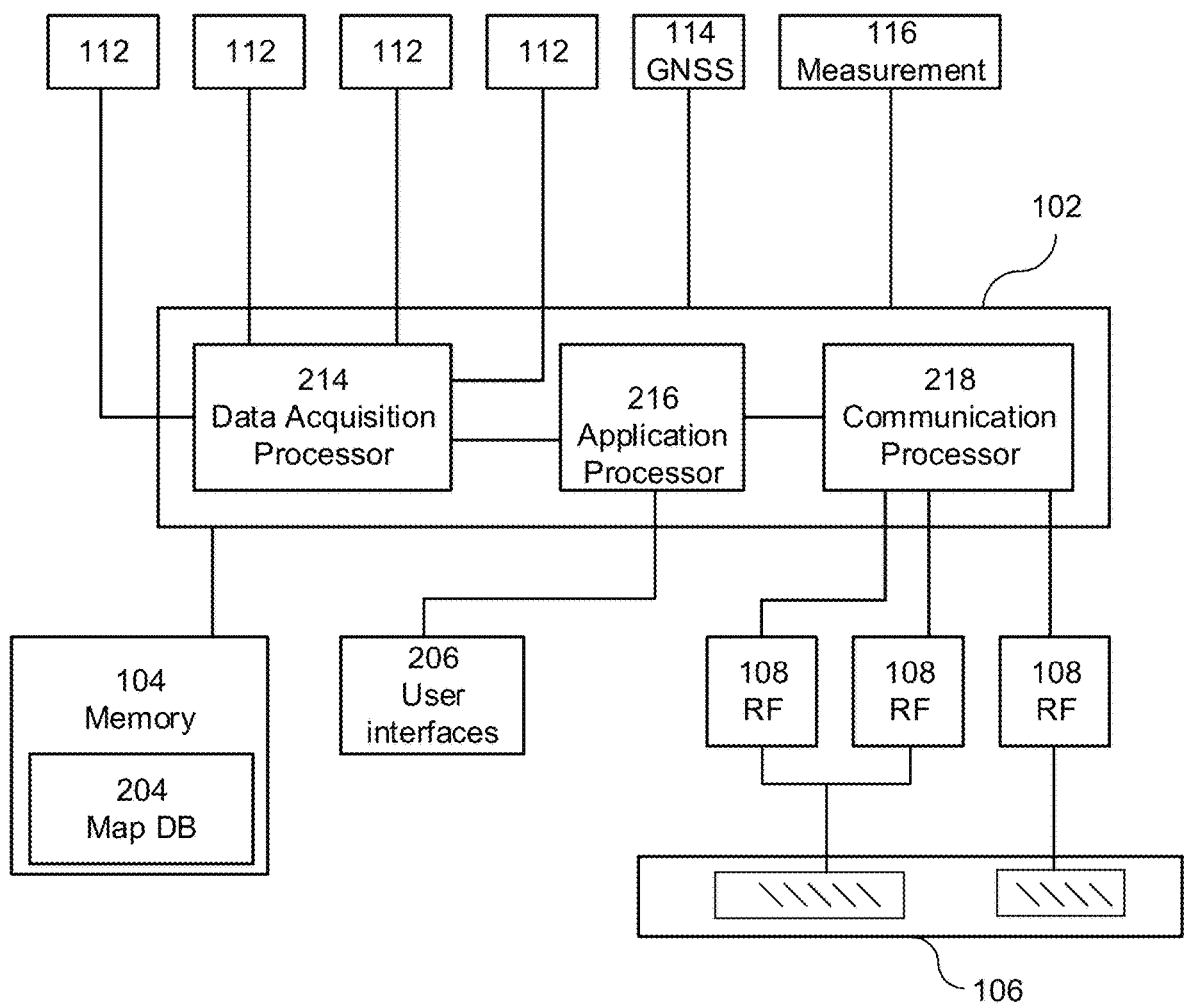
FIG. 2 shows various exemplary electronic components of a safety system of the vehicle in accordance with various aspects of the disclosure.

The control system 200 may include various components depending on the particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 216 may include processing circuitry, such as a CPU, for processing data acquired by data acquisition units 112. For example, if one or more data acquisition units are implemented as image acquisition units, e.g. one or more cameras, then the data acquisition processor may include image processors for processing image data using the information obtained from the image acquisition units as an input. The data acquisition processor 216 may, therefore, be configured to create voxel maps detailing the surrounding of the vehicle 100 based on the data input from the data acquisition units 112 (e.g., cameras).

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UI) 206 for supporting user interaction with vehicle 100, and/or various user applications. Application processor 216 may interface with communication processor 218 and act as a source (in the transmit path) and a sink (in the receive path) for data (e.g., user data), such as voice data, audio/video/image data, messaging data, application data, basic Internet/web access data, etc. In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver(s) 108. RF transceiver(s) 108 may then process the digital baseband samples to convert the digital baseband samples to analog RF signals, which RF transceiver(s) 108 may wirelessly transmit via antenna system 106. In the receive path, RF transceiver(s) 108 may receive analog RF signals from antenna system 106 and process the analog RF signals to obtain digital baseband samples. RF transceiver(s) 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via one or more user interfaces 206. User interfaces 206 may include one or more screens, microphones, mice, touchpads, keyboards, or any other interface providing a mechanism for user input.

The communication processor 218 may include a digital signal processor and/or a controller which may direct such communication functionality of vehicle 100 according to the communication protocols associated with one or more radio access networks, and may execute control over antenna system 106 and RF transceiver(s) 108 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 100 shown in FIGS. 1 and 2 may depict only a single instance of such components.

Vehicle 100 may transmit and receive wireless signals with antenna system 106, which may be a single antenna or an antenna array that includes multiple antenna elements. In some aspects, antenna system 202 may additionally include analog antenna combination and/or beamforming circuitry. In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. In some aspects, communication processor 218 may control the radio transmission and reception of RF transceiver(s) 108, including specifying the transmit and receive radio frequencies for operation of RF transceiver(s) 108.

According to some aspects, communication processor 218 includes a baseband modem configured to perform physical layer (PHY, Layer 1) transmission and reception processing to, in the transmit path, prepare outgoing transmit data provided by communication processor 218 for transmission via RF transceiver(s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of the digital signal processor may be realized as a coupled integrated circuit.

Vehicle 100 may be configured to operate according to one or more radio communication technologies. The digital signal processor of the communication processor 218 may be responsible for lower-layer processing functions (e.g., Layer 1/PHY) of the radio communication technologies, while a controller of the communication processor 218 may be responsible for upper-layer protocol stack functions (e.g., Data Link Layer/Layer 2 and/or Network Layer/Layer 3). The controller may thus be responsible for controlling the radio communication components of vehicle 100 (antenna system 106, RF transceiver(s) 108, position device 114, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 100 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 100 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 218 may include executable instructions that define the logic of such functions.

In some aspects, vehicle 100 may be configured to transmit and receive data according to multiple radio communication technologies. Accordingly, in some aspects one or more of antenna system 106, RF transceiver(s) 108, and communication processor 218 may include separate components or instances dedicated to different radio communication technologies and/or unified components that are shared between different radio communication technologies. For example, in some aspects, multiple controllers of communication processor 218 may be configured to execute multiple protocol stacks, each dedicated to a different radio communication technology and either at the same processor or different processors. In some aspects, multiple digital signal processors of communication processor 218 may include separate processors and/or hardware accelerators that are dedicated to different respective radio communication technologies, and/or one or more processors and/or hardware accelerators that are shared between multiple radio communication technologies. In some aspects, RF transceiver(s) 108 may include separate RF circuitry sections dedicated to different respective radio communication technologies, and/or RF circuitry sections shared between multiple radio communication technologies. In some aspects, antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Communication processor 218 may be configured to operate via a first RF transceiver of the one or more RF transceivers(s) 108 according to different desired radio communication protocols or standards. By way of example, communication processor 218 may be configured in accordance with a Short-Range mobile radio communication standard, such as Bluetooth, Zigbee, among others, and the first RF transceiver may correspond to the corresponding Short-Range mobile radio communication standard. As another example, communication processor 218 may be configured to operate via a second RF transceiver of the one or more RF transceivers(s) 108 in accordance with a Medium or Wide Range mobile radio communication standard such as a 3G (e.g. Universal Mobile Telecommunications System—UMTS), a 4G (e.g. Long Term Evolution—LTE), a 5G mobile radio communication standard in accordance with corresponding 3GPP (3rd Generation Partnership Project) standards, among others. As a further example, communication processor 218 may be configured to operate via a third RF transceiver of the one or more RF transceivers(s) 108 in accordance with a Wireless Local Area Network communication protocol or standard, such as in accordance with IEEE 802.11 (e.g. 802.11, 802.11a, 802.11b, 802.11g, 802.11n, 802.11p, 802.11-12, 802.11ac, 802.11ad, 802.11ah, among others). The one or more RF transceiver(s) 108 may be configured to transmit signals via antenna system 106 over an air interface. The RF transceivers 108 may each have a corresponding antenna element of antenna system 106, or may share an antenna element of the antenna system 106.

Memory 204 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. In some aspects, each of the one or more antennas of antenna system 106 may be placed at a plurality of locations on the vehicle 100 in order to increase RF coverage. The antennas may include a phased antenna array, a switch-beam antenna array with multiple antenna elements, etc. Antenna system 106 may be configured to operate according to analog and/or digital beamforming schemes in order to signal gains and/or provide levels of information privacy. Antenna system 106 may include separate antennas dedicated to different respective radio communication technologies, and/or antennas shared between multiple radio communication technologies. While shown as a single element in FIG. 1, antenna system 106 may include a plurality of antenna elements (e.g., antenna arrays) positioned at different locations on vehicle 100. The placement of the plurality of antenna elements may be strategically chosen in order to ensure a desired degree of RF coverage. For example, additional antennas may be placed at the front, back, corner(s), and/or on the side(s) of the vehicle 100.

Data acquisition devices 112 may include any number of data acquisition devices and components depending on the requirements of a particular application. This may include: image acquisition devices, proximity detectors, acoustic sensors, infrared sensors, piezoelectric sensors, etc., for providing data about the vehicle's environment. Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each of the data acquisition units may be configured to observe a particular type of data of the vehicle's 100 environment and forward the data to the data acquisition processor 214 in order to provide the vehicle with an accurate portrayal of the vehicle's environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, a humidity sensor (e.g., a hygrometer) for measuring a humidity, a distance meter to measure a roughness of a ground, a pressure sensor for measuring a pressure in the surround of the vehicle 100, a torque sensor for measuring a torque of the vehicle 100, a steering angle sensor for measuring a steering angle or a turning angle of the vehicle 100, etc. It is appreciated that vehicle 100 may have different measurement devices 116 depending on the vehicle type, e.g., car vs. drone vs. boat.

Position devices 114 may include components for determining a position of the vehicle 100. For example, this may include global position system (GPS) or other global navigation satellite system (GNSS) circuitry configured to receive signals from a satellite system and determine a position of the vehicle 100. Position devices 114, accordingly, may provide vehicle 100 with satellite navigation features.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (such as images, radar signals, depth information from LIDAR, stereo processing of two or more images, etc.) of the environment of the vehicle 100 together with position information (such as a GPS coordinate, a vehicle's ego-motion, etc.) to determine a current location of the vehicle 100 relative to the known landmarks, and refine the determination of the vehicle's location. Certain aspects of this technology may be included in a localization technology such as a mapping and routing model.

The map database (DB) 204 may include any type of database storing (digital) map data for the vehicle 100, e.g., for the control system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In some aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields, such as landmark type, landmark location, among other potential identifiers.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model, such as a safety driving model. The control system 200 may be or may include a safety system 200 and may include (e.g., as part of the driving model) a computer implementation of a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an engine control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to implement the aspects and methods described herein.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure.

Figure 3:
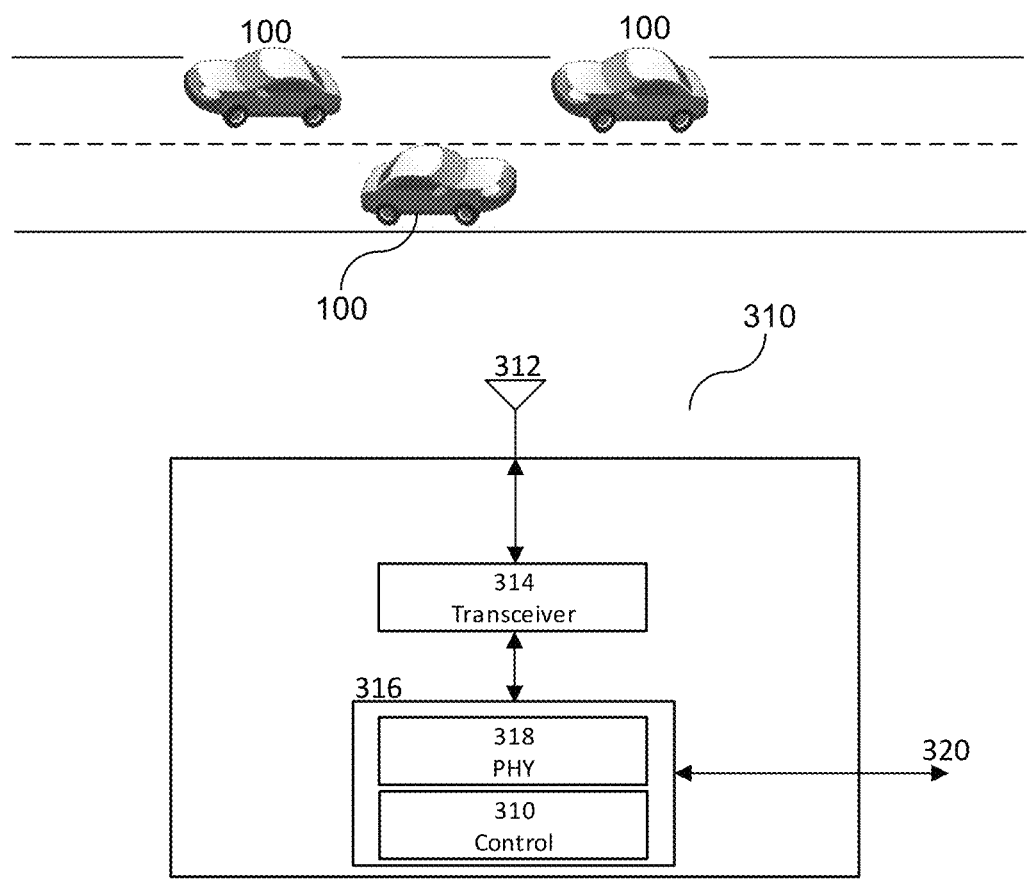
FIG. 3 shows an exemplary network area with various communication devices in accordance with various aspects of the disclosure.

FIG. 3 shows an exemplary network area 300 according to various aspects of the disclosure. Network area 300 may include a plurality of vehicles 100, which may include, for example, drones and ground vehicles. Any one of these vehicles may communicate with one or more other vehicles 100 and/or with network infrastructure element (NIE) 310. NIE 310 may be (for example, a base station (e.g. an eNodeB, a gNodeB, etc.), a road side unit (RSU), a road sign, etc.) configured to wirelessly communicate with vehicles and/or a mobile radio communication network, etc., and serve as an interface between one or more of vehicles 100 and a mobile radio communications network (e.g., an LTE network or a 5G network).

NIE 310 may include, among other components, at least one of an antenna system 312, a RF transceiver 314, and a baseband circuit 316 with appropriate interfaces between each of them. In an abridged overview of the operation of NIE 310, NIE 310 may transmit and receive wireless signals via antenna system 312, which may be an antenna array including multiple antenna arrays. Antenna system 312 may include multiple antenna elements (e.g., multiple antenna arrays) in order to employ multiple-input and multiple-output (MIMO) methods and schemes.

RF transceiver 314 may perform transmit and receive RF processing to convert outgoing baseband samples from baseband circuit 316 into analog radio signals to provide to antenna system 312 for radio transmission and to convert incoming analog radio signals received from antenna system 312 into baseband samples to provide to baseband circuit 316. Accordingly, RF transceiver 314 may be configured to operate similarly to the RF transceiver(s) described in FIGS. 1 and 2, albeit perhaps on a much larger scale (e.g., amplifiers to transmit higher power signals, etc.).

Baseband circuit 316 may include a controller 310 and a physical layer processor 318 which may be configured to perform transmit and receive PHY processing on baseband samples received from RF transceiver 314 to provide to a controller 310 and on baseband samples received from controller 310 to provide to RF transceiver 314. In some aspects, the baseband modem 316 may be located external to the NIE 310, e.g., at a centralized location of a mobile radio communication network. Controller 310 may control the communication functionality of NIE 310 according to the corresponding radio communication technology protocols, which may include exercising control over antenna system 312, RF transceiver 314, and physical layer processor 318. Each of the RF transceiver 314, physical layer processor 318, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. NIE 310 may also include an interface 320 for communicating with (e.g. receiving instructions from, providing data to, etc.) with a core network according to some aspects.

Additionally, NIE 310 may include a memory 330, which may be internal to NIE 310 (as shown in FIG. 3) or external to NIE 310 (not shown). Memory 330 may store one or more maps of the coverage area of NIE 310 among other types of information. Each of the one or more maps may include a static layer depicting environmental elements that remain largely unchanged over longer periods of time (e.g., roads, structures, trees, etc.) and/or a dynamic layer with more frequent changes (e.g., vehicles, detected obstacles, construction, etc.). In some aspects, memory 330 may also store maps corresponding to one or more neighboring areas of NIE 310 so as to provide vehicles within its coverage area with information of neighboring coverage areas (e.g., to facilitate the process when a vehicle moves to the coverage of the neighboring NIE).

Figure 4A:
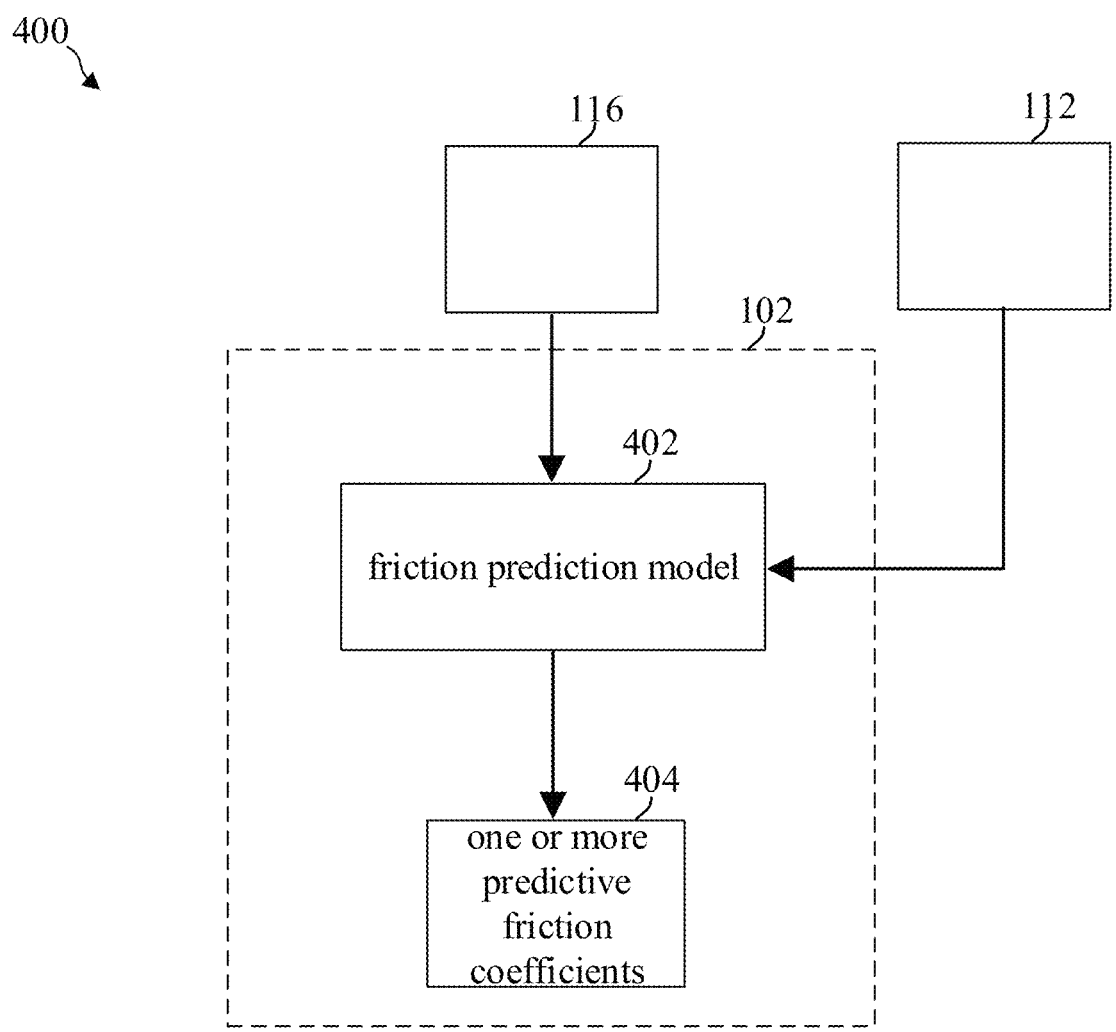

FIG. 4A shows an example of a processing system 400 in accordance with various aspects of this disclosure. The processing system 400 may be part of a safety system server. The processing system 400 may be part of the safety system 200. The safety system 200 may be a safety system for a ground vehicle, such as the vehicle 100. The ground vehicle may be configured to drive on the ground (e.g., a road). The ground vehicle may be configured to drive in a driving direction. In the following, the ground vehicle will be described with reference to the vehicle 100, however, it should be noted that the ground vehicle may also be any other kind of ground vehicle as described above.

The processing system 400 may include one or more processors, such as the one or more processors 102. The one or more processors 102 may be configured to implement a friction prediction model 402. The friction prediction model 402 may be configured to process data provided by the one or more measurement sensors 116. The friction prediction model 402 may be configured to process data provided by the one or more data acquisition devices 112. The friction prediction model 402 may be configured to determine one or more predictive friction coefficients 404. The friction prediction model 402 may be configured to determine the one or more predictive friction coefficients 404 using the data provided by the one or more measurement sensors 116 and/or the data provided by the one or more data acquisition devices 112. The one or more measurement sensors 116 and/or the one or more data acquisition devices 112 may be configured to provide first ground condition data. The first ground condition data may represent conditions of the ground at or near the position of the vehicle 100, for example below the vehicle 100, for example between the ground and the vehicle 100, for example next to the vehicle 100. The one or more measurement sensors 116 and/or the one or more data acquisition devices 112 may be configured to provide second ground condition data. The second ground condition data may represent conditions of the ground in front of the vehicle 100 with respect to the driving direction of the vehicle 100.

Conditions of the ground may include one or more of a temperature of the ground or near the ground (for example, several centimeters (cm) above the ground, such as up to 50 cm above the ground), a type of the ground, a material the ground includes or the ground is composed of, a barometric pressure near the ground, a humidity of the ground or near the ground, a roughness of the ground, among others. The roughness of the ground may indicate an even or an uneven ground. The roughness of the ground may indicate a surface texture of the ground. The roughness may be a micrometer roughness. The roughness may be described by a roughness parameter. The roughness parameter may be given by the ISO 4287:1997 standard.

The friction prediction model 402 may be configured to determine the one or more predictive friction coefficients 404 using the first ground condition data and/or the second ground condition data provided by the one or more measurement sensors 116 and/or the one or more data acquisition devices 112.

The one or more processors 102 may be configured to use the friction prediction model 402 to determine the one or more predictive friction coefficients 404. The determined one or more predictive friction coefficients 404 may be predictive friction coefficients between the ground (such as, a road) and one or more tires of the vehicle 100. The one or more predictive friction coefficients 404 may represent a ratio of force of friction between the ground and the one or more tires of the vehicle 100. The one or more predictive friction coefficients 404 may be predictive friction coefficients between the ground and the one or more tires of the vehicle 100 in front of the vehicle 100 with respect to the driving direction of the vehicle 100. For example, the one or more predictive friction coefficients 404 may be friction coefficients, which are predicted between the ground and the one or more tires of the vehicle 100 in front of the vehicle 100. For example, the one or more predictive friction coefficients 404 may be friction coefficients, which are predicted between the ground and the one or more tires of the vehicle 100 on a future position of the vehicle 100 on the ground. For example, the one or more predictive friction coefficients 404 may be friction coefficients, which are predicted between the ground and the one or more tires of the vehicle 100 in dependence of a location (e.g., future position of the vehicle 100) and time. Thus, the one or more predictive friction coefficients 404 may be location dependent and/or time varying friction coefficients. For example, the one or more predictive friction coefficients 404 may be dependent of the location x (e.g., $x \in R^3$) and/or dependent of the time t (e.g., $t \in R^+$).

The one or more processors 102 may be configured to use the friction prediction model 402 to determine the one or more predictive friction coefficients 404 for each tire of the one or more tires of the vehicle 100. The determined one or more friction coefficients associated to a tire of the one or more tires of the vehicle 100 may represent a friction coefficient between the ground and the respective tire of the vehicle 100.

According to various aspect of the disclosure, the vehicle 100 may include left tires (for example two left tires, for example more than two left tires) positioned on a left side of the vehicle 100 and may include right tires (for example two right tires, for example more than two right tires) positioned on a right side of the vehicle 100. The one or more processors 102 may be configured to use the friction prediction model 402 to determine the one or more predictive friction coefficients for the left tires and one or more predictive friction coefficients for the right tires.

Figure 4B:
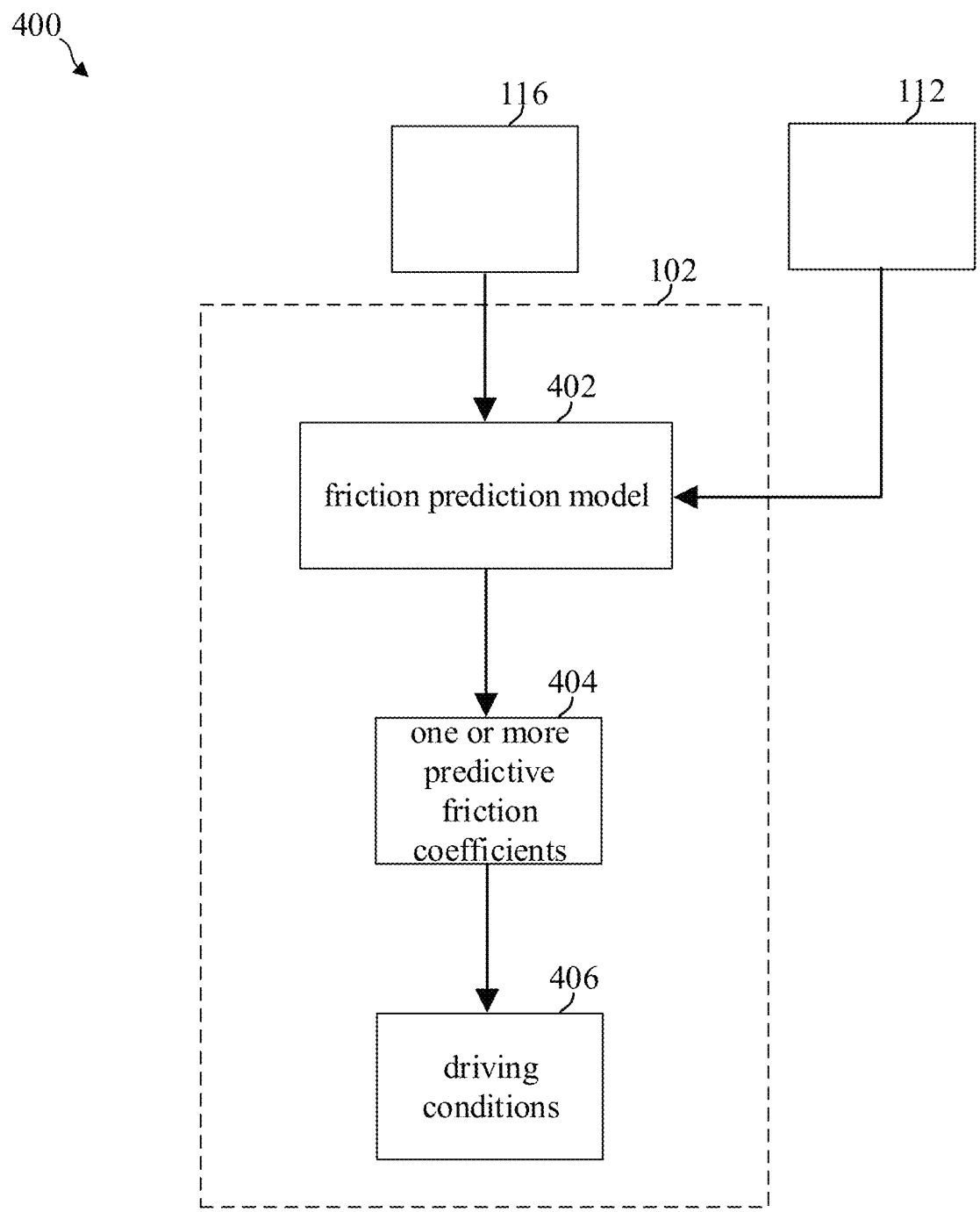

FIG. 4B shows an example of the processing system 400 in accordance with various aspects of this disclosure. The one or more processors 102 may be further configured to determine driving conditions 406 of the vehicle 100. The one or more processors 102 may be configured to determine the driving conditions 406 of the vehicle 100 using the determined one or more predictive friction coefficients 404. The driving conditions may include, for instance, one or more of a maximal acceleration during driving, a minimal acceleration during braking, a maximal acceleration during braking, among others. The one or more processors 102 may be configured to determine the maximal acceleration during driving, the minimal acceleration during braking, and/or the maximal acceleration during braking using the one or more predictive friction coefficients 404.

Figure 4C:
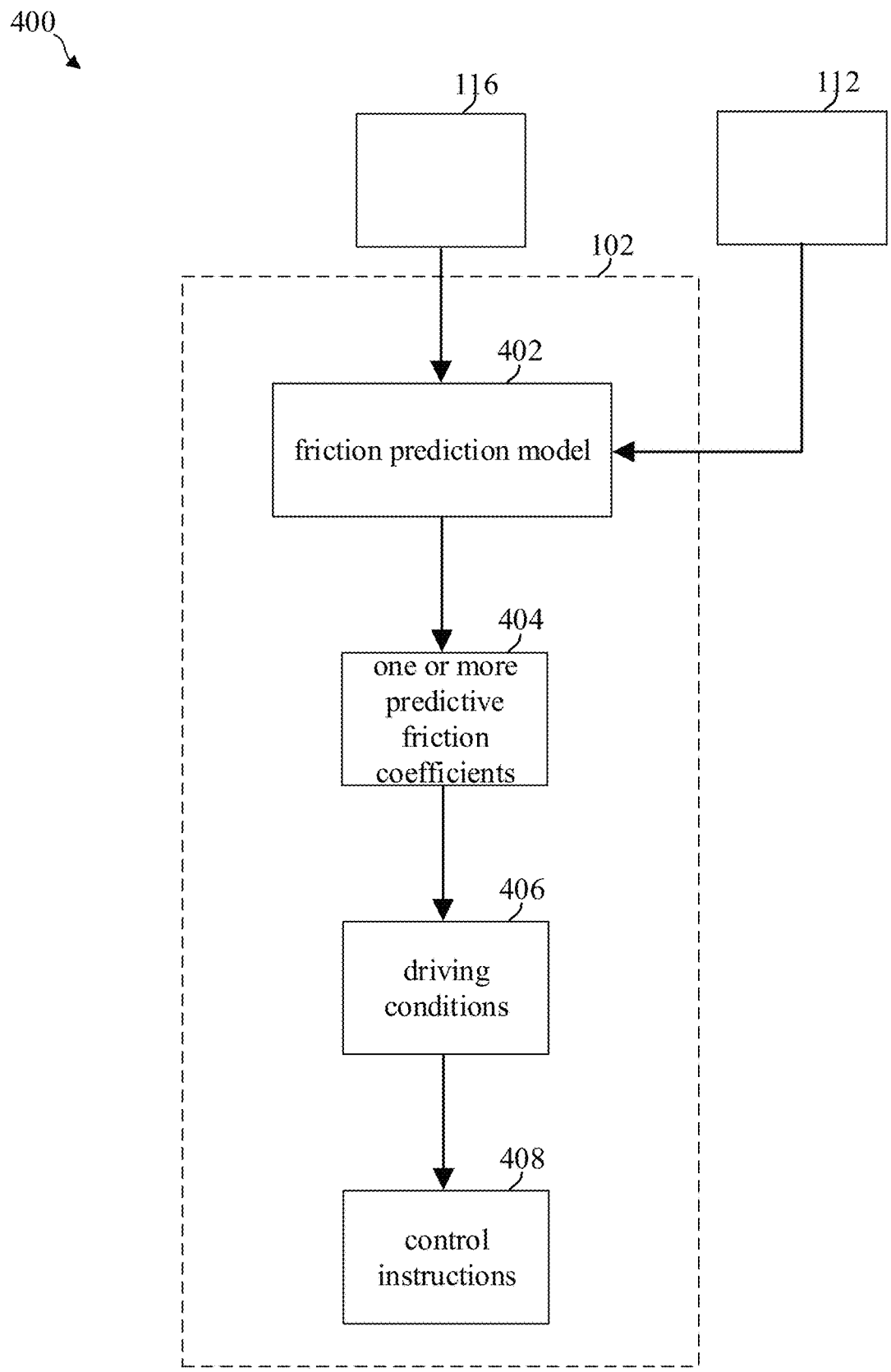

FIG. 4C shows an example of the processing system 400 in accordance with various aspects of this disclosure. The one or more processors 102 may be further configured to provide control instructions 408. The one or more processors 102 may be configured to provide the control instructions 408 to control the vehicle 100 to operate in accordance with the driving conditions 406. As described above, the processing system 400 may be part of the safety system 200. The one or more processors 102 may be configured to provide the control instructions 408 to the mobility system 120. The mobility system 120 may direct the navigation and/or mobility of vehicle 100 in response to the provided control instructions 408.

Figure 4D:
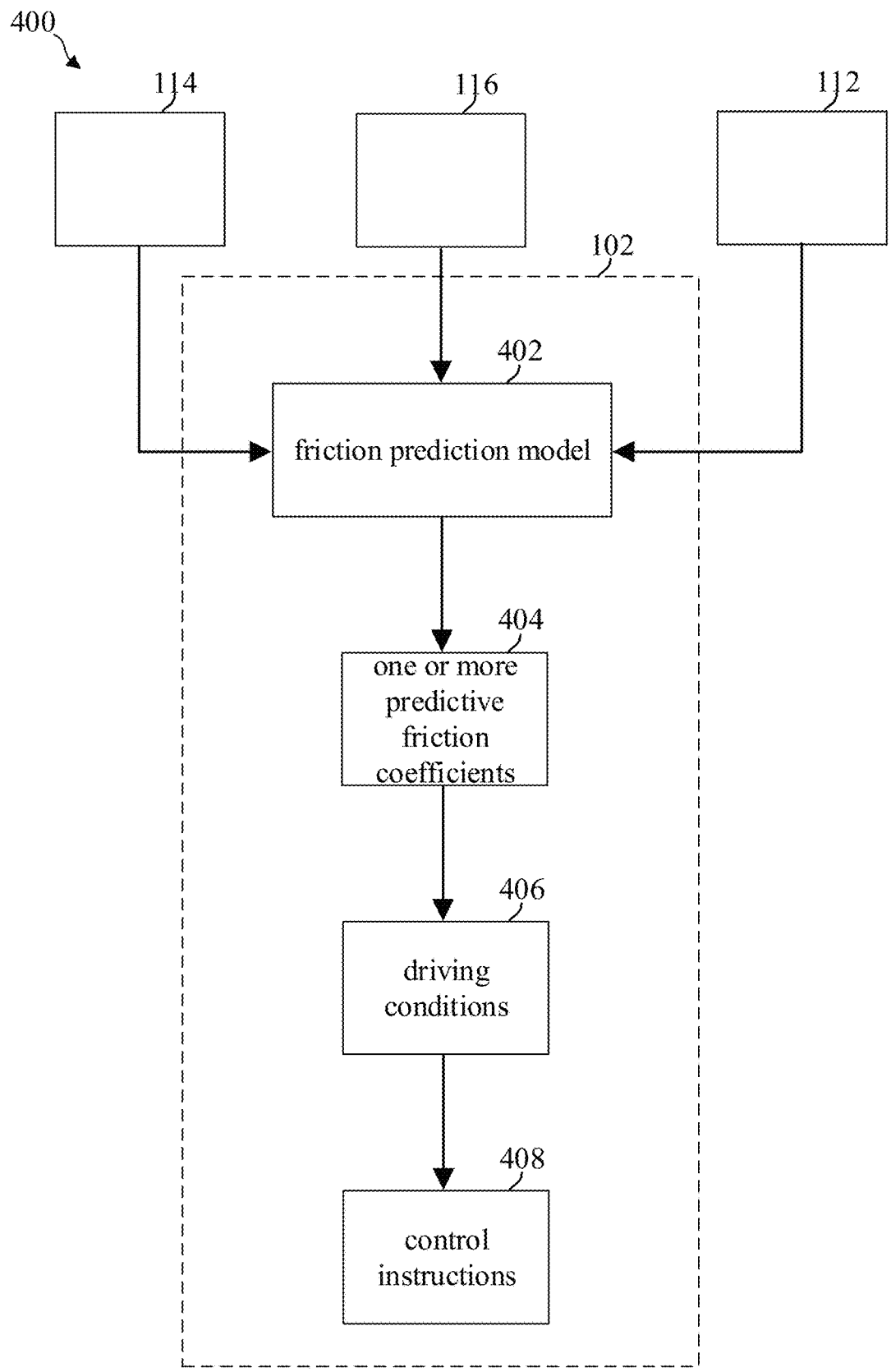

FIG. 4D shows an example of the processing system 400 in accordance with various aspects of this disclosure. The friction prediction model 402 may be further configured to process data provided by one or more position devices 114. The friction prediction model 402 may be configured to determine the one or more predictive friction coefficients 404 using the data provided by the one or more position devices 114. The friction prediction model 402 may be configured to determine the one or more predictive friction coefficients 404 using the data provided by the one or more measurement sensors 116, the data provided by the one or more data acquisition devices 112, and/or the data provided by the one or more position devices 114.

Figure 4E:
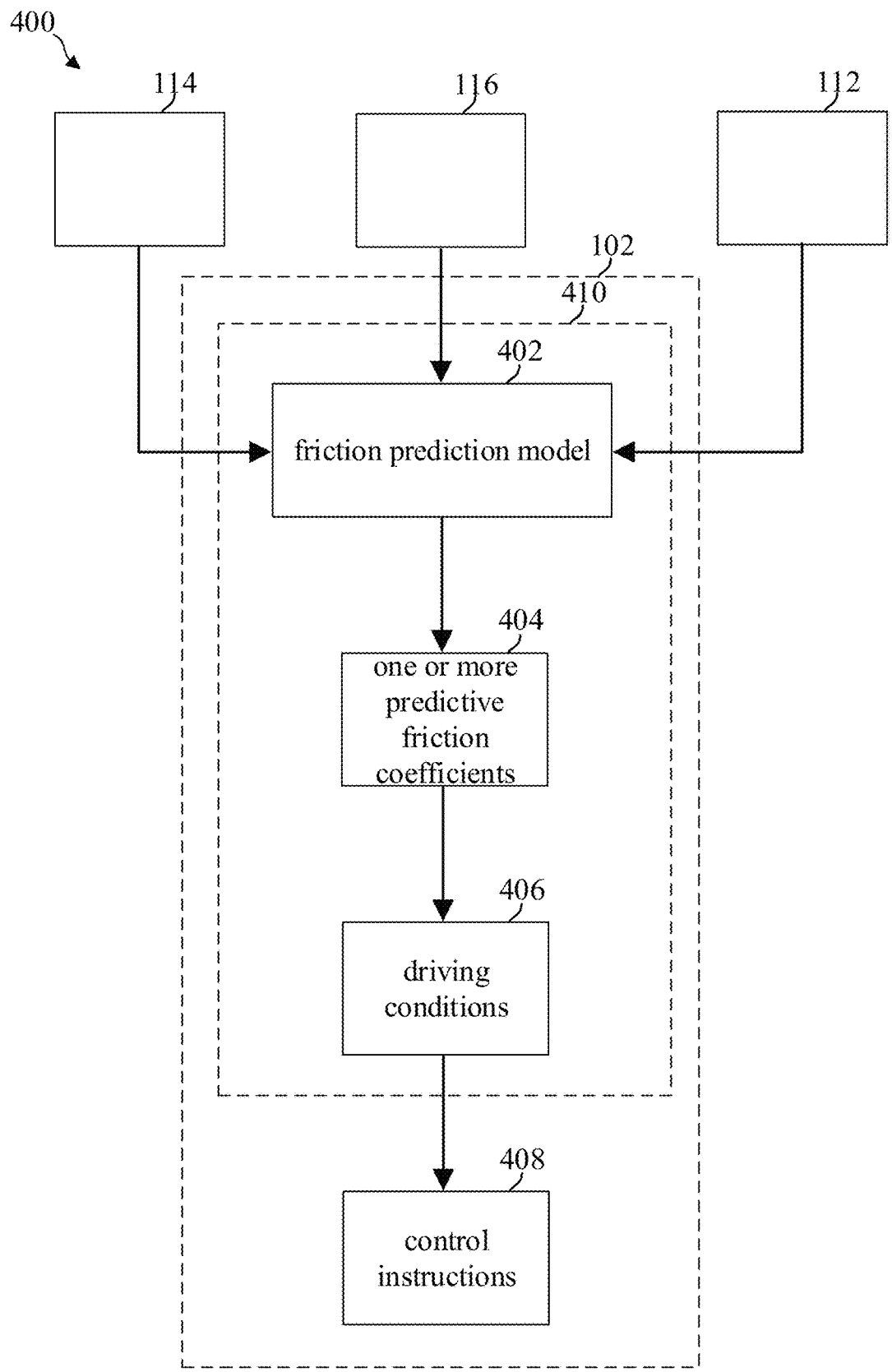

FIG. 4E shows an example of the processing system 400 in accordance with various aspects of this disclosure. The one or more processors 102 may be configured to implement a safety driving model 410. The safety driving model 410 may be a safety driving model as explained above. The safety driving model 410 may include the friction prediction model 402 to determine the one or more predictive friction coefficients 404. The safety driving model 410 may be configured to determine the driving conditions 406 using the determined one or more predictive friction coefficients 404. The safety driving model 410 may be configured to provide the control instructions 408. The safety driving model 410 may be configured to provide the control instructions 408 to the mobility system 120. The safety driving model 410 may be configured to provide the control instructions 408 to the mobility system 120 to control the vehicle 100 to operate in accordance with the driving conditions.

Figure 4F:
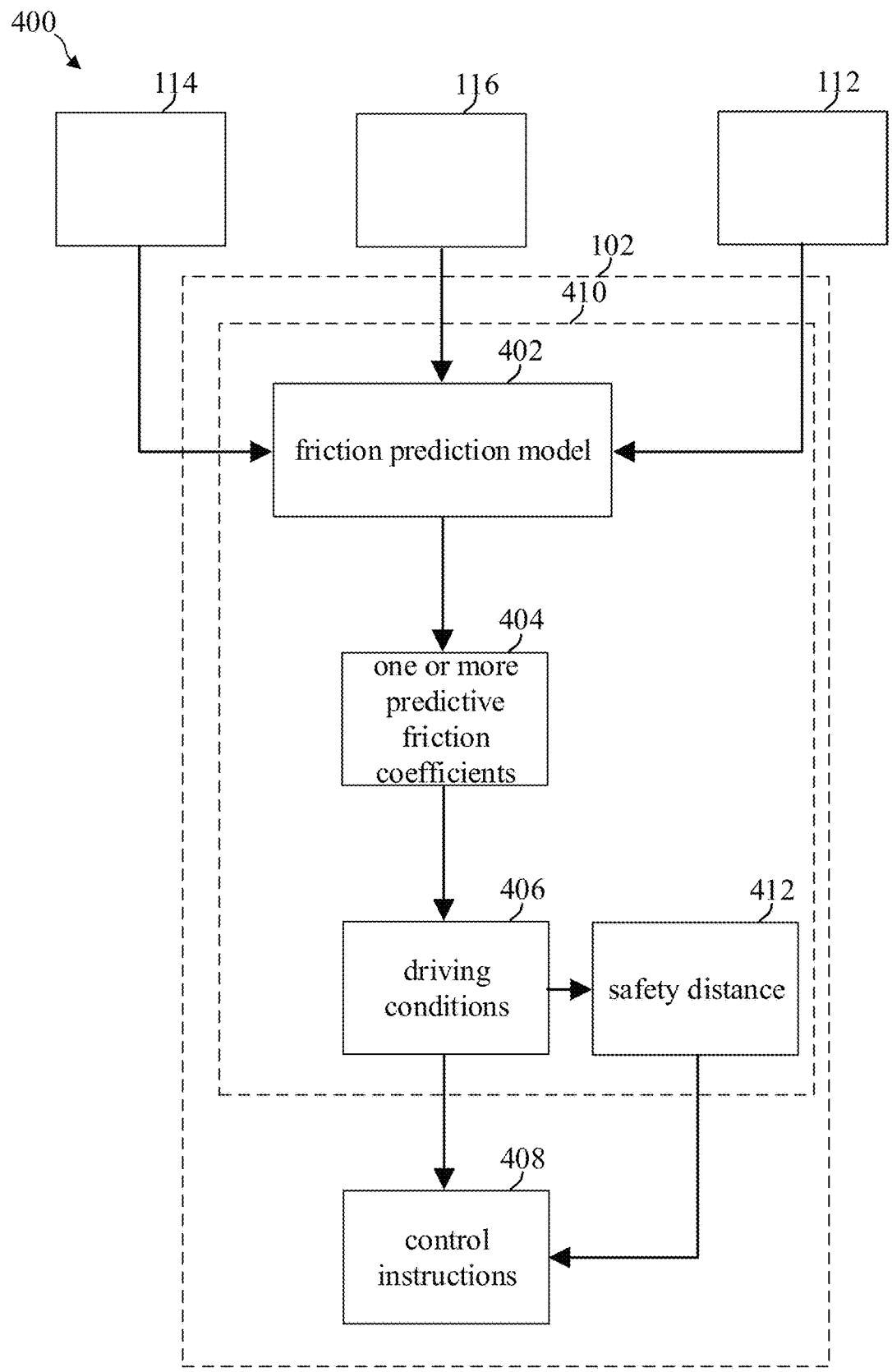

FIG. 4F shows an example of the processing system 400 in accordance with various aspects of this disclosure. The one or more processors 102 may be configured to determine a safety distance 412, for example a minimal safety distance. The safety distance 412 may be or may include a minimal longitudinal distance and/or a minimal lateral distance between the vehicle 100 and another vehicle. The one or more processors 102 may be configured to determine the safety distance 412 using the determined driving conditions 406. The one or more processors 102 may be configured to determine the safety distance 412 based on the one or more predictive friction coefficients 404. Thus, the determined safety distance 412 may be a predictive safety distance 412. For example, the safety distance 412 may be a predicted safety distance 412 about a future position of the vehicle 100. The one or more processors 102 may be further configured to provide the control instructions 408 to control the vehicle 100 to operate in accordance with the determined safety distance 412 and/or in accordance with the determined driving conditions 406. For example, the predicted safety distance 412 indicates a future safety distance 412 with no change to a current safety distance and the operation of the vehicle 100 may not ye changed. For example, the predicted safety distance 412 indicates a reduction of a future safety distance 412 with respect to a current safety distance and the operation of the vehicle 100 may be change in accordance with the reduced future safety distance 412, for example the vehicle 100 may be operated to slow down.

For example, the safety driving model 410 may be configured to determine the safety distance 412 using the driving conditions 406. The safety driving model 410 may be further configured to provide the control instructions 408 to control the vehicle 100 to operate in accordance with the determined safety distance 412 and/or in accordance with the determined driving conditions 406. The safety driving model 410 may be configured to provide the control instructions 408 to the mobility system 120 to control the vehicle 100 to operate in accordance with the driving conditions 406 and/or the safety distance 412. Before detailing further examples of the processing system 400 (see FIGS. 4G and 4H) in accordance with various aspects of the disclosure, exemplary scenarios illustrating a safety distance will be described.

Figure 9A:
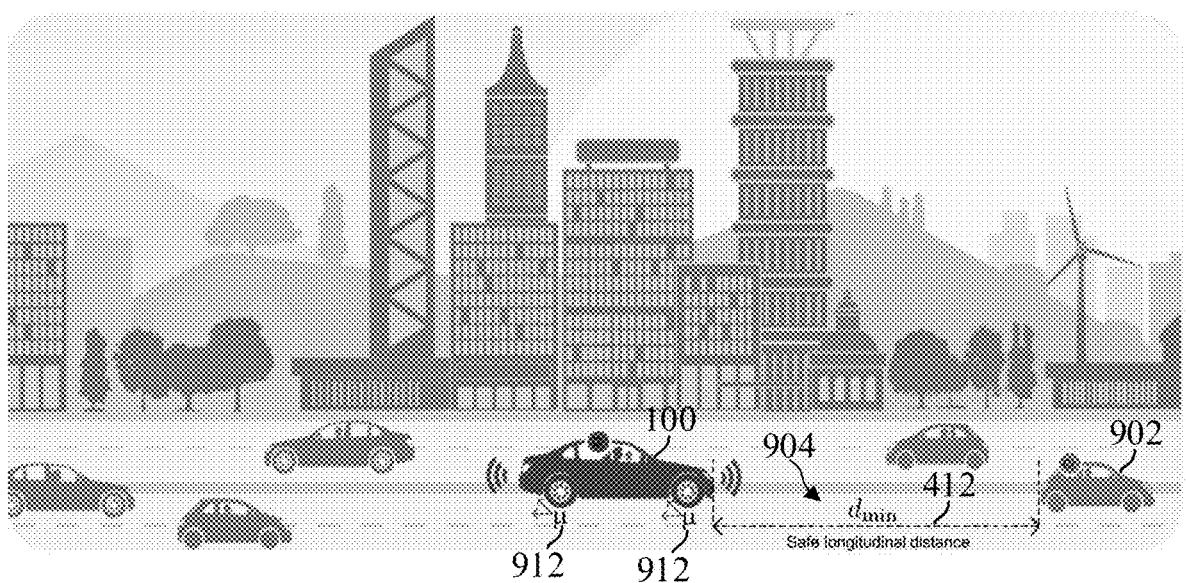
FIG. 9A to FIG. 9C show exemplary scenarios illustrating a safety distance in accordance with various aspects of the disclosure.
Figure 9B:
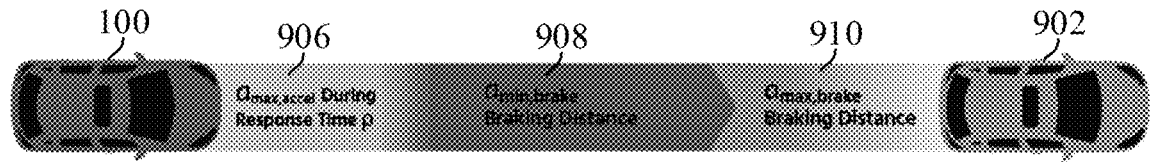
Figure 9C:
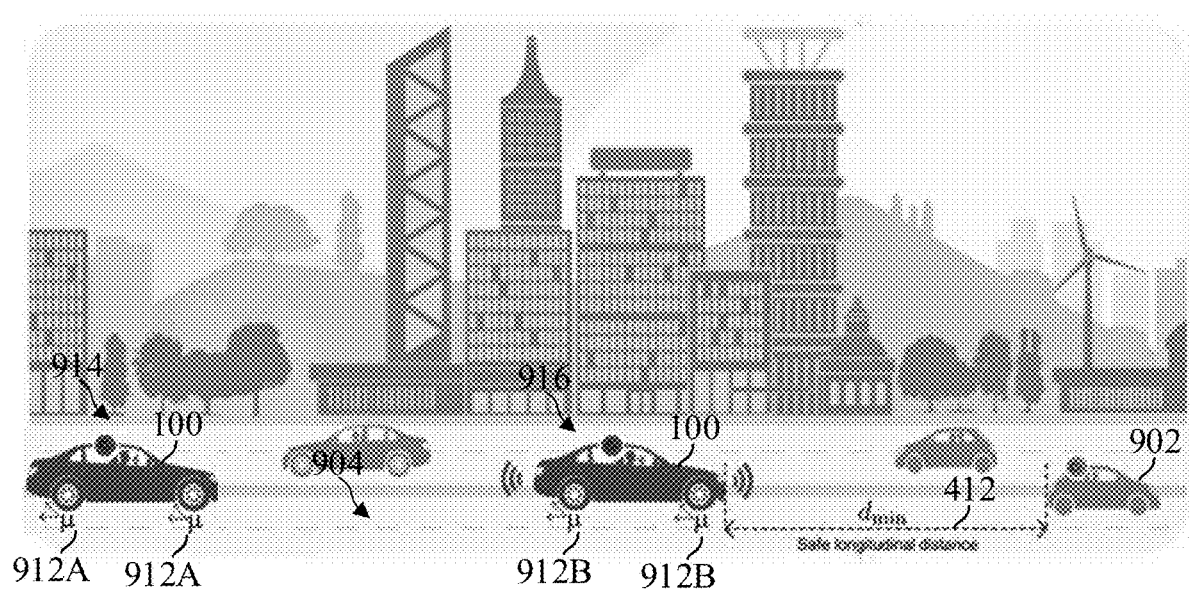

FIG. 9A to FIG. 9C show exemplary scenarios illustrating a safety distance (such as the safety distance 412) in accordance with various aspects of the disclosure. The safety distance 412 may be or may include a longitudinal distance between the vehicle 100 and another object, such as another vehicle 902 (see FIG. 9A). The vehicle 100 and the other vehicle 902 may be driven on the ground 904. The other vehicle 902 may be driven along the same longitudinal direction as the vehicle 100 or the other vehicle 902 may be driven in an opposite longitudinal direction as the vehicle 100 (for example the other vehicle 902 may be an oncoming vehicle).

First, the case where the vehicle 100 and the other vehicle 902 are driven along the same longitudinal direction is considered: The safety distance 412 may be determined using a covered distance (for example a distance covered by the vehicle 100 in a response time), a maximal acceleration during a response time 906 of the vehicle 100, a minimal intensity braking distance 908, and/or a maximal braking distance 910 (see FIG. 9B). The response time may be a response time of the vehicle 100. The response time of the vehicle 100 may be or may include a response time of a driver of the vehicle 100 and/or a response time of a driving system (for example including a safety system and a mobility system) controlling the vehicle 100. The minimal intensity braking distance 908 may represent a distance covered by the vehicle 100 during braking with a braking intensity for a safe and comfortable driving experience. The maximal intensity braking distance 910 may represent a distance covered by the other vehicle 902 during braking with a maximal braking intensity, for example during an emergency braking. The maximal intensity braking distance 910 may represent a distance required to fully stop the other vehicle 902 during braking with a maximal braking intensity.

The safety distance 412 may be determined using equation (1):

$$d_{min} = [v_r\rho + \tfrac{1}{2}a_{max,accel}\rho^2 + (v_r + \rho a_{max,accel})^2 / 2a_{min,brake} - v_f^2/2a_{max,brake}]_+ \quad (1)$$

$d_{min}$ may be the safety distance 412, $d_{min}$ may be $d_{min} \in R^+$,
$v_r$ may be the velocity of the vehicle 100,
$v_f$ may be the velocity of the other vehicle 902,
$\rho$ may be the response time of the vehicle 100, $\rho$ may be $\rho \in R^+$,
$a_{max,accel}$ may be a maximal acceleration of the vehicle 100 during driving, $a_{max,accel}$ may be $a_{max,accel} \in R$,
$a_{min,brake}$ may be a minimal acceleration during braking of the vehicle 100, $a_{min,brake}$ may be $a_{min,brake} \in R$,
$a_{max,brake}$ may be a maximal acceleration during braking of the other vehicle 902, $a_{max,brake}$ may be $a_{max,brake} \in R$, and
+ may be $[x]_+ := \max\{0, x\}$.

The covered distance may be determined by the first member of equation (1). The covered distance may be determined using the velocity of the vehicle 100 and the response time of the vehicle 100. A distance covered by the vehicle 100 due to the maximal acceleration during the response time 906 may be determined by the second member of equation (1). The minimal intensity braking distance 908 may be determined by the third member of equation (1). The minimal intensity braking distance 908 may be determined using the velocity of the vehicle 100, the response time of the vehicle 100, the maximal acceleration during driving, and/or the minimal acceleration during braking. The maximal braking distance 910 may be determined by the fourth member of equation (1). The maximal braking distance 910 may be determined using the velocity of the other vehicle 902 and/or the maximal acceleration during braking of the other vehicle 902.

Second, the case where the vehicle 100 and the other vehicle 902 are driven in opposite longitudinal directions is considered: The velocity of the vehicle 100 may be positive ($v_r > 0$) and the velocity of the other vehicle 902 may be negative ($v_f < 0$). The safety distance 412 may be determined using equation (2):

$$d_{min} = \left[ \begin{array}{l} v_r\rho + \tfrac{1}{2}a_{max,accel}\rho^2 + \dfrac{(v_r + \rho a_{max,accel})^2}{2a_{min,brake}} + \\ |v_f|\rho_f + \tfrac{1}{2}a_{max,accel,f}\rho_f^2 + \dfrac{(|v_f| + \rho_f a_{max,accel,f})^2}{2a_{min,brake,f}} \end{array} \right] \quad (2)$$

$\rho_f$ may be the response time of the other vehicle 902, $\rho_f$ may be $\rho_f \in R^+$,
$a_{max,accel,f}$ may be a maximal acceleration of the other vehicle 902 during driving, $a_{max,accel,f}$ may be $a_{max,accel,f} \in R$, and
$a_{min,brake,f}$ may be a minimal acceleration during braking of the other vehicle 902, $a_{min,brake,f}$ may be $a_{min,brake,f} \in R$.

The safety distance 412 may be determined using the distance covered by the vehicle 100 in the response time given by the first member of equation (2), the distance covered by the vehicle 100 due to the maximal acceleration during the response time given by the second member of equation (2), the minimal intensity braking distance of the vehicle 100 given by the third member of equation (2), a distance covered by the other vehicle 902 in a response time of the other vehicle 902 given by the fourth member of equation (2), a distance covered by the other vehicle 902 due to the maximal acceleration of the other vehicle 902 during the response time of the other vehicle 902 given by the fifth member of equation (2), and a minimal intensity braking distance of the other vehicle 902 given by the sixth member of equation (2). The response time of the other vehicle 902 may be or may include a response time of a driver of the other vehicle 902 and/or a response time of a driving system (for example including a safety system and a mobility system) controlling the other vehicle 902.

The safety distance 412 may be or may include a minimal lateral distance between the vehicle 100 and the other vehicle 902. The safety distance 412 may be determined using equation (3):

$$d_{min} = u + \left[ \begin{array}{l} v_r^{lat}\rho + \tfrac{1}{2}a_{max,accel}^{lat}\rho^2 + \dfrac{(v_r^{lat} + \rho a_{max,accel}^{lat})^2}{2a_{min,brake}^{lat}} - \\ \left( |v_f^{lat}|\rho_f + \tfrac{1}{2}a_{max,accel}^{lat}\rho_f^2 - \dfrac{(|v_f^{lat}| + \rho_f a_{max,accel,f}^{lat})^2}{2a_{min,brake,f}^{lat}} \right) \end{array} \right] \quad (3)$$

$v_r^{lat}$ may be a lateral velocity of the vehicle 100,
$v_f^{lat}$ may be a lateral velocity of the other vehicle 902,
u may be a minimal final distance between the vehicle 100 and the other vehicle 902 after both perform braking to zero lateral velocity,
$a_{max,accel}^{lat}$ may be a maximal lateral acceleration of the vehicle 100 during driving, $a_{max,accel}^{lat}$ may be $a_{max,accel}^{lat} \in R$,
$a_{min,brake}^{lat}$ may be a minimal lateral acceleration during braking of the vehicle 100, $a_{min,brake}^{lat}$ may be $a_{min,brake}^{lat} \in R$, $a_{max,accel,f}^{lat}$ may be a maximal lateral acceleration of the other vehicle 902 during driving, $a_{max,accel,f}^{lat}$ may be $a_{max,accel,f}^{lat} \in \mathbb{R}$, and $a_{min,brake,f}^{lat}$ may be a minimal lateral acceleration during braking of the other vehicle 902, $a_{min,brake,f}^{lat}$ may be $a_{min,brake,f}^{lat} \in \mathbb{R}$.

The safety distance 412 may be determined using a lateral distance covered by the vehicle 100 in the response time given by the first member of equation (3), a lateral distance covered by the vehicle 100 due to the maximal lateral acceleration during the response time given by the second member of equation (3), a minimal intensity lateral braking distance of the vehicle 100 given by the third member of equation (3), a lateral distance covered by the other vehicle 902 in a response time of the other vehicle 902 given by the fourth member of equation (3), a lateral distance covered by the other vehicle 902 due to the maximal lateral acceleration of the other vehicle 902 during the response time of the other vehicle 902 given by the fifth member of equation (3), and a minimal intensity lateral braking distance of the other vehicle 902 given by the sixth member of equation (3).

A moving object, such as the driving vehicle 100, with a mass, m, moving at a speed, v, has a kinetic energy, $E_k$, given by equation (4):

$$E_k = \tfrac{1}{2}mv^2 \qquad (4)$$

For the vehicle 100 to come to a full stop (v=0), a force-friction, F, given by equation (5) may be needed:

$$F = \mu mg \cdot \cos \alpha \qquad (5)$$

g may be the constant of gravitation,

μ may be the friction coefficient (e.g., the dynamic friction coefficient of the wheels of the vehicle 100 are not blocking; for example, the wheels may not block due to an ABS system included in the vehicle 100), and α may be an angle between the applied force F and a surface contact plane, such as the ground 904.

Considering a collinear ground 904, the angle α may be equal to or close to 0. If the angle α is equal to or close to 0, the term cos α may be equal or close to 1

The work realized by brakes, $W_b$, may be described by the force-friction, F, and a braking distance, d, and may be given by equation (6):

$$W_b = Fd = \mu mgd \qquad (6)$$

Including equation (4) to equation (6) may lead to equation (7):

$$W_b = E_k \Rightarrow \mu mgd = \tfrac{1}{2}mv^2 \qquad (7)$$

With respect to equation (7), the braking distance, d, may be given by equation (8):

$$d = \frac{v^2}{2\mu g} \qquad (8)$$

Thus, the braking distance, d, may be independent of the mass, m, of the vehicle 100. A rate change of the braking distance, d, with the friction coefficient, μ, may be given by equation (9):

$$\frac{\delta d}{\delta \mu} = -\frac{v^2}{2g\mu^2} \qquad (9)$$

Thus, changes to the friction coefficient, μ, may change the braking distance, d, quadratically. The friction may be modeled stochastically using a Gaussian distribution with a standard deviation, σ, such as given by equation (10):

$$\mu^* = \psi(\mu, \bar{\mu}, \sigma) = e^{\left(\frac{(\mu^*-\bar{\mu})^2}{-2\sigma^2}\right)} \qquad (10)$$

A rate change of the braking distance, d, with the friction coefficient, μ, using the Gaussian distribution of equation (10) may be given by equation (11):

$$\frac{\delta d}{\delta \mu^*} = -\frac{v_o^2}{2g e^{\left(\frac{(\mu^*-\bar{\mu})^2}{-\sigma^2}\right)}} \qquad (11)$$

Thus, changes to the standard deviation, σ, may change the braking distance, d, quadratically.

Referring to FIG. 9A, the safety distance 412 may be determined by one or more braking distances, such as the minimal intensity braking distance 908 and/or the maximal intensity braking distance 910, using one or more friction coefficients 912 (for example one or more friction coefficients for each tire of one or more tires of the vehicle 100).

Referring to FIG. 9C, the vehicle 100 may drive on the ground 904 from a first position 914 to a second position 916. A friction between the ground 904 and the one or more tires of the vehicle 100 at the first position 914 may be described by one or more friction coefficients 912A. At the first position 914, the one or more processor 102 may, as described above, determine one or more predictive friction coefficients, such as the one or more predictive friction coefficients 912B. The one or more predictive friction coefficients 912B may be predictive friction coefficients between the ground 904 and the one or more tires of the vehicle 100 in front of the vehicle 100 with respect to the driving direction of the vehicle 100. The one or more predictive friction coefficients 912B may be predictive friction coefficients between the ground 904 and the one or more tires of the vehicle 100 at a future position of the vehicle 100, such as the second position 916. After describing exemplary scenarios illustrating a safety distance in accordance with various aspects of the disclosure, further examples of the processing system 400 (see FIGS. 4G and 4H) will be described.

Figure 4G:
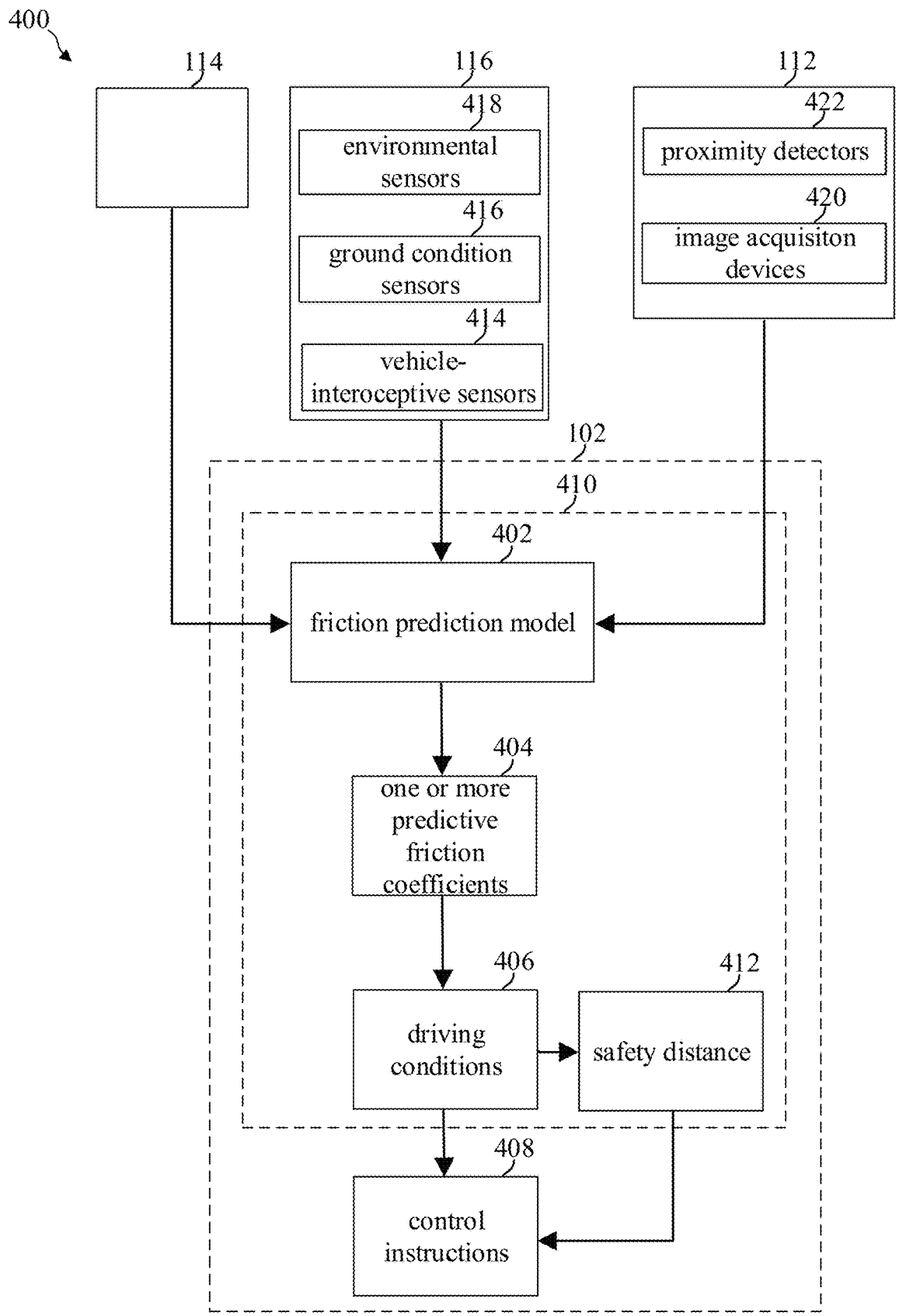

FIG. 4G shows an example of the processing system 400 in accordance with various aspects of this disclosure. The vehicle 100 may include one or more vehicle-interoceptive sensors 414. The safety system 200 may be configured to process data provided by the one or more vehicle-interoceptive sensors 414 using, for example, the one or more processors 102. The vehicle 100 may include one or more ground condition sensors 416. The safety system 200 may be configured to process data provided by the one or more ground condition sensors 416 using, for example, the one or more processors 102. The vehicle 100 may include one or more environmental sensor 418. The safety system 200 may be configured to process data provided by the one or more environmental sensors 418 using, for example, the one or more processors 102. The data acquisition devices 112 may, as described above, include one or more image acquisition devices, such as image acquisition devices 410, and/or one or more proximity detectors, such as proximity detectors 422.

As described above, the friction prediction model 402 may be configured to determine the one or more predictive friction coefficients 404 using data provided by the one or more measurement sensors 116, data provided by the one or more data acquisition devices 112, and/or data provided by the one or more position devices 114. According to various aspect of the disclosure, the one or more measurement sensors 116 may include the one or more vehicle-interoceptive sensors 414, the one or more ground condition sensors 416, and/or the one or more environmental sensors 418. It should be noted that the one or more vehicle-interoceptive sensors 414, the one or more ground condition sensors 416, and/or the one or more environmental sensors 418 may also include position devices 114 and/or data acquisition devices 112.

The friction model 402 may be configured to determine the one or more predictive friction coefficients 404 using data provided by one or more of the following: the one or more vehicle-interoceptive sensors 414, the one or more ground condition sensors 416, the one or more environmental sensors 418, the one or more position devices 114, the image acquisition devices 420, the proximity detectors 422, among others.

As described above, the friction prediction model 402 may be configured to determine the one or more predictive friction coefficients 404 using the first ground condition data and/or the second ground condition data. The first ground condition data may represent conditions of the ground at or near the position of the vehicle 100 (for example several cm next to the vehicle 100, such as up to 50 cm next to the vehicle) and the second ground condition data may represent conditions of the ground in front of the vehicle 100 with respect to the driving direction of the vehicle 100.

The one or more ground condition sensors 416 may be configured to provide the first ground condition data. The first ground condition data may include one or more of a temperature of the ground or near the ground, a humidity of the ground or near the ground, a roughness of the ground and others.

The one or more ground condition sensors 416 may include at least one hygrometer. The at least one hygrometer may be configured to provide humidity data and the humidity data may include the humidity (e.g., amount of humidity) of the ground and/or near the ground at or near the position of the vehicle 100 (for example at the ground at the position of the vehicle 100, for example between the ground and the vehicle 100 at the position of the vehicle 100). The humidity data may include a humidity close to the wheels of the vehicle 100. The humidity data may include at least one humidity (e.g., amount of humidity) $h_t^H$ at a time t (e.g., $h_t^H \in R$). The time t may be real-time (e.g., having a latency less than 1 second).

The one or more ground condition sensors 416 may at least one pyrometer. The at least one pyrometer may be configured to provide temperature data and temperature data may include the temperature of the ground and/or near the ground at or near the position of the vehicle 100 (for example at the ground at the position of the vehicle 100, for example between the ground and the vehicle 100 at the position of the vehicle 100). The temperature data may include a temperature close to the wheels of the vehicle 100. The temperature data may include at least one temperature $t_t^P$ at a time t (e.g., $t_t^P \in R$). The time t may be real-time (e.g., having a latency less than 1 second).

The one or more ground condition sensors 416 may include at least one line-distance meter. The at least one line-distance meter may be configured to provide roughness data. The roughness data may include at least one roughness of the ground at or near the position of the vehicle 100. The roughness data may include a roughness of the ground close to the wheels of the vehicle 100 (e.g., a roughness of the ground within a wheel path of the wheels). The roughness data may include at least one roughness $r_t^L$ at a time t (e.g., $r_t^L \in R^m$). The time t may be real-time (e.g., having a latency less than 1 second). The at least one line-distance meter may be a laser-based line-distance meter. The at least one line-distance meter may be a high-speed line camera (e.g. m a micrometer-accurate high-speed line camera).

According to various aspects of the disclosure, the vehicle 100 may include one or more PHIL modules. A PHL module may include the at least one pyrometer, the at least one hygrometer, and the at least one line-distance meter. The vehicle 100 may one or more tires and may include a PHL module of one or more PHL modules associated to each tire of the one or more tires of the vehicle 100. Each PHL module of the one or more PHL modules may be arranged next to (e.g., close to) the respective tire of the vehicle 100. The sensors of the PHL module (e.g., the pyrometer, the hygrometer, and/or the line-distance meter) may be configured such that sensor data (e.g., data describing the ground condition) may be detected (e.g., measured) contactless. For example, a PHL module may be arranged such that the sensors (e.g., the pyrometer, the hygrometer, and/or the line-distance meter) detect data of the ground (for example the condition of the ground) within the wheel path of the vehicle 100. Thus, the PHL module may provide data describing the ground condition close to the tires or wheels of the vehicle 100.

The second ground condition data may include context data. The context data may represent a surrounding of the vehicle 100. For example, the context data may represent a scene in the surrounding of the vehicle 100. The scene and/or the surrounding of the vehicle 100 may include other vehicles, cyclists, pedestrians, houses, one or more roads, trees, one or more sidewalks, the sky, green areas, etc.

The one or more data acquisition devices 112 may be configured to provide the context data. The one or more data acquisition devices 112 may be configured such that the context data may be detected (e.g., measured) contactless. The context data may include image data and/or proximity data.

The one or more data acquisition devices 112 may include the one or more image acquisition devices 420 configured to provide the image data.

The image data may include one or more color images. The one or more image acquisition devices 420 may include one or more camera sensors of diverse wavelengths (e.g., one or more visible-light camera sensors). In the following, the one or more camera sensors will be described for one or more visible-light camera sensors, however, please note that any other camera sensor or camera sensors of various wavelengths may be used. The one or more visible-light camera sensors may be configured to provide the one or more color images. The one or more color images may be visible wavelength images. The one or more visible-light camera sensors may be arranged at or near a windshield of the vehicle 100. The one or more visible-light camera sensors may be configured to provide the one or more color images $Y_t$ at a time t (e.g., $Y_t: N^2 \mapsto N^3$). The time t may be real-time (e.g., having a latency less than 1 second).

The image data may include one or more thermal images. The one or more image acquisition devices 420 may include one or more thermal-near-infrared camera sensors. The one or more thermal-near-infrared camera sensors may be configured to provide the one or more thermal images. The one or more thermal camera sensors may be arranged at or near the windshield of the vehicle 100. The one or more thermal camera sensors may be configured to provide the one or more thermal images $T_t$ at a time t (e.g., $T_t:N^2 \mapsto N$). The time t may be real-time (e.g., having a latency less than 1 second).

Furthermore, the image data may include a combination of a color image (and/or a black and white image) and a thermal image.

The one or more data acquisition devices 112 may include one or more proximity detectors 422 configured to provide the proximity data.

The proximity data may include LIDAR data and/or radar data.

The one or more proximity detectors 422 may include one or more LIDAR sensors. The one or more LIDAR sensors may be configured to provide the LIDAR data. The LIDAR data may include a reflectance map, for example a reflectance map of the surrounding of the vehicle 100, for example a reflectance map of the ground (e.g., road) in the surrounding of the vehicle 100. A reflectance map may be an image in polar coordinates. The image in polar coordinates of the reflectance map may map to a distance and a reflectance value (e.g., per optical ray). The one or more LIDAR sensors may be configured to provide one or more reflectance maps $\Phi_t$ at a time t (e.g., $\Phi_t:N^2 \mapsto N^2$). The time t may be real-time (e.g., having a latency less than 1 second).

The one or more proximity detectors 422 may include one or more radar sensors. The one or more radar sensors may be configured to provide the radar data. The radar data may include an absorption map, for example an absorption map of the surrounding of the vehicle 100, for example an absorption map of the ground (e.g., road) in the surrounding of the vehicle 100. An absorption map may be an image in polar coordinates. The image in polar of the absorption map coordinates may map to a distance and an absorption value (e.g., per beam). The one or more radar sensors may be configured to provide one or more absorption maps $\Psi_t$ at a time t (e.g., $\Psi_t:N^2 \mapsto N^2$). The time t may be real-time (e.g., having a latency less than 1 second).

The second ground condition data may include environmental data. The environmental data may represent environmental conditions in the surrounding of the vehicle 100. For example, the environmental conditions may include temperatures in the surrounding of the vehicle 100, a barometric pressure in the surrounding of the vehicle 100, a humidity in the surround of the vehicle 100, etc.

The environmental data may include one or more of: temperature data, barometric pressure data, humidity data, among others. The one or more environmental sensors 418 may be configured to provide the environmental data. The one or more environmental sensors 418 may be configured such that the environmental data may be detected (e.g., measured) contactless.

The one or more environmental sensors 418 may include one or more temperature sensors (e.g., thermometer). The one or more temperature sensors may be configured to provide the temperature data. The temperature data may include at least one temperature in the surrounding (e.g., outside) of the vehicle 100. The temperature data may include at least one temperature $t_t$ at a time t (e.g., $t_t \in R$). The time t may be real-time (e.g., having a latency less than 1 second).

The one or more environmental sensors 418 may include one or more pressure sensors (e.g., barometer). The one or more pressure sensors may be configured to provide the barometric pressure data. The barometric pressure data may include at least one barometric pressure (e.g., atmospheric pressure) in the surrounding (e.g., outside) of the vehicle 100. The barometric pressure data may include at least one barometric pressure (e.g., atmospheric pressure) $b_t$ at a time t (e.g., $b_t \in R$). The time t may be real-time (e.g., having a latency less than 1 second).

The one or more environmental sensors 418 may include one or more humidity sensors (e.g., one or more hygrometer). The one or more humidity sensors may be configured to provide the humidity data. The humidity data may include at least one humidity (e.g., amount of humidity) and/or water vapor (e.g., amount of water vapor) on or near the ground in the surrounding (e.g., outside) of the vehicle 100 (for example at the ground in the surrounding (e.g., outside) of the vehicle 100, for example above the ground in the surrounding (e.g., outside) of the vehicle 100, such as in front of the vehicle 100 with respect to a driving direction of the vehicle 100, behind the vehicle 100 with respect to a driving direction of the vehicle 100, on the left side outside of the vehicle 100, and/or on the right side outside of the vehicle 100). The humidity data may include at least one humidity (e.g., amount of humidity) and/or water vapor (e.g., amount of water vapor) $h_t$ at a time t (e.g., $h_t \in R$). The time t may be real-time (e.g., having a latency less than 1 second).

The friction prediction model 402 may be further configured to determine the one or more predictive friction coefficients 404 using navigational data. Thus, the friction prediction model 402 may be configured to determine the one or more predictive friction coefficients 404 using the first ground condition data, the second ground condition data, and/or navigational data. The navigational data may represent an inertial navigation state of the vehicle 100. For example, the inertial navigation state may represent a moving of the vehicle 100 from a first position to a second position (e.g., a position may be described by a global positioning system, GPS). For example, the inertial navigation state may represent an acceleration of the vehicle 100 during moving (e.g., driving) from the first position to the second position. For example, the inertial navigation state may represent an angular velocity of the vehicle 100 during moving (e.g., driving) from the first position to the second position.

The navigational data may be detected (e.g., measured) using one or more inertial measurement units (IMU).

The navigational data may include position data. The position data may represent a position of the vehicle 100. The navigational data may include acceleration data, such as three-dimensional acceleration data. The three-dimensional acceleration data may represent a three-dimensional acceleration of the vehicle 100. The navigational data may include angular velocity data. The angular velocity data may represent an angular velocity of the vehicle 100.

The one or more position devices 114 may be configured to provide the navigational data. The one or more position devices 114 may be configured such that the navigational data may be detected (e.g., measured) contactless.

The one or more position devices 114 may include one or more position sensors (e.g., GPS sensors, e.g., a multi-antenna GPS). The one or more position sensors may be configured to provide the position data. The position data may include a current position of the vehicle 100. The current position of the vehicle 100 may include a latitude position, a longitude position, and/or an elevation (e.g., a latitude position, a longitude position, and/or an elevation on the earth). The position data may include at least one position $X_t$ at a time t (e.g., $X_t \in R^3$). The time t may be real-time (e.g., having a latency less than 1 second). The one or more processors 102 may be configured to process to position data and may be configured to convert the position data into a local Euclidian metric system (for example using a Mercator transformation).

The one or more position devices 114 may include one or more acceleration sensors (e.g. an accelerometer). The one or more acceleration sensors may be configured to provide the three-dimensional acceleration data. The three-dimensional acceleration data may include one or more three-dimensional acceleration vectors. The one or more three-dimensional acceleration vectors may include a gravitational component. The three-dimensional acceleration data may include at least one three-dimensional acceleration vector at $a_t$ a time t (e.g., $a_t \in R^3$). The time t may be real-time (e.g., having a latency less than 1 second).

The one or more position devices 114 may include one or more angular velocity sensors (e.g., a gyroscope). The one or more angular velocity sensors may be configured to provide the angular velocity data. The angular velocity data may include one or more angular velocity vectors (e.g., rotation speed vectors). The angular velocity data may include at least one angular velocity vector (e.g., rotation speed vector) $\beta_t$ at a time t (e.g., $\beta_t \in R^3$). The time t may be real-time (e.g., having a latency less than 1 second).

The friction prediction model 402 may be further configured to determine the one or more predictive friction coefficients 404 using vehicle-interoceptive sensor-data. Thus, the friction prediction model 402 may be configured to determine the one or more predictive friction coefficients 404 using the first ground condition data, the second ground condition data, the navigational data, and/or the vehicle-interoceptive sensor-data. The vehicle-interoceptive sensor-data may represent conditions of the vehicle 100. For example, the conditions of the vehicle 100 include parameters of the mobility system 120. For example, the conditions of the vehicle 100 include a speed or velocity of the vehicle 100, an acceleration of the vehicle 100, a torque of the vehicle 100, a turning angle or steering angle of the vehicle 100, among others.

The vehicle-interoceptive sensor-data may include speed data. The speed data may represent a speed and/or velocity of the vehicle 100. The vehicle-interoceptive sensor-data may include acceleration data, such as scalar acceleration data. The scalar acceleration data may represent a scalar acceleration of the vehicle 100. The vehicle-interoceptive sensor-data may include torque data. The torque data may represent a torque of the vehicle 100. The vehicle-interoceptive sensor-data may include torque data. The torque data may represent a torque of the vehicle 100. The vehicle-interoceptive sensor-data may include turning/steering angle data. The turning/steering angle data may represent a turning angle of the vehicle 100 and/or a steering angle of the vehicle 100.

The vehicle-interoceptive sensors 414 may be configured to provide the vehicle-interoceptive sensor-data.

The vehicle-interoceptive sensors 414 may include one or more speed sensors and/or one or more velocity sensors. The one or more speed sensors (e.g., an odometer) and/or one or more velocity sensors may determine a speed or velocity using an odometry of one or more wheels. For example, the one or more speed sensors may determine a speed for each wheel of one or more wheels (each wheel may be associated to a tire of the one or more tires). For example, the speed may be an average speed determined by the one or more processors 102 for the one or more speeds associated to the one or more wheels. The one or more speed sensors and/or one or more velocity sensors may be configured to provide the speed data. The one or more speed sensors and/or one or more velocity sensors may be configured to provide speed data to a CAN bus (Controller Area Network bus) of the vehicle 100. The speed data may include at least one speed $v_t$ at a time t (e.g., $v_t \in R$). The time t may be real-time (e.g., having a latency less than 1 second).

The vehicle-interoceptive sensors 414 may include one or more acceleration sensors. The one or more acceleration sensors may be configured to provide the scalar acceleration data. The one or more acceleration sensors may be configured to provide the scalar acceleration data to the CAN bus of the vehicle 100. The vehicle-interoceptive sensors 414 may include one or more tachometers (e.g., motor tachometer). The one or more tachometers may be configured to provide tachometer data and the one or more processors 102 may be configured to determine the scalar acceleration data (e.g., including a scalar acceleration) using the tachometer data. The scalar acceleration data may include at least one acceleration $a_t$ at a time t (e.g., $a_t \in R$). The time t may be real-time (e.g., having a latency less than 1 second). The at least one acceleration at may be a rate of change of the speed $v_t$. For example, $a_t$ may be given by: $a_t = \delta(v_t^i)/\delta t$.

The vehicle-interoceptive sensors 414 may include one or more torque sensors. The one or more torque sensors may be configured to provide the torque data. The one or more torque sensors may be configured to provide the torque data to the CAN bus of the vehicle 100. The one or more torque sensors may be configured to detect (e.g., to measure) a wrench, such as a wrench applied to the motor of the vehicle 100. The torque data may include at least one torque $\tau_t$ at a time t (e.g., $\tau_t \in R$). The time t may be real-time (e.g., having a latency less than 1 second).

The vehicle-interoceptive sensors 414 may include one or more turning angle sensors and/or one or more steering angle sensors. The one or more turning angle sensors and/or one or more steering angle sensors may be configured to provide the turning/steering angle data. The one or more turning angle sensors and/or one or more steering angle sensors may be configured to provide the turning/steering angle data to the CAN bus of the vehicle 100. The turning/steering angle data may be detected (e.g., measured) at a rotation encoder of the vehicle 100. The turning angle or steering angle may be an angle of direction. The turning angle or steering angle may be an angle of direction measure at a steering wheel of the vehicle 100. The turning/steering angle data may include at least one turning angle or steering angle $\alpha_t$ at a time t (e.g., $\alpha_t \in R$). The time t may be real-time (e.g., having a latency less than 1 second).

FIG. 4H shows an example of the processing system 400 in accordance with various aspects of this disclosure.

The friction prediction model 402 may include a motion model 424. The motion model 424 may describe a motion of the vehicle 100. For example, the motion model 424 may describe a motion of the vehicle 100 from a first position to a second position.

The motion model 424 may be configured to process the navigational data. The motion model 424 may be further configured to process the vehicle-interoceptive sensor-data. The motion model 424 may be configured to provide motion data 426 using the navigational data and/or the vehicle-interoceptive sensor-data. The motion data 426 may represent a motion state of the vehicle 100. The motion data 426 may include a current position of the vehicle 100. The current position of the vehicle 100 may be a GPS position. The current position of the vehicle 100 may include a latitude position and/or a longitude position (e.g., a latitude position and/or a longitude position on the earth). The motion data 426 may include an orientation of the vehicle 100. The orientation of the vehicle 100 may include an angle of the vehicle 100 with respect to a reference position (for example, with respect to the north pole). The motion data 426 may describe a motion state of the vehicle 100 and may include the current position of the vehicle 100, the orientation of the vehicle 100, a speed of the vehicle 100, and/or an acceleration of the vehicle 100.

According to various aspects of this disclosure, the motion model 424 may be configured to determine (e.g., generate) a motion feature vector. The motion feature vector may have a reduced dimensionality (e.g., within a latent space). The motion feature vector may include encoded navigational data and/or encoded vehicle-interoceptive sensor-data. The motion model 424 may be or may include a neural network and the neural network may be configured to determine the motion feature vector. The motion model 424 may be or may include an encoder and the encoder may be configured to determine the motion feature vector. The encoder (e.g. motion encoder) may be configured to encode the navigational data and/or the vehicle-interoceptive sensor-data. The motion encoder may be a trained motion encoder. The motion encoder may have been trained using an autoencoder (e.g., motion autoencoder). The motion autoencoder may include the motion encoder and a motion decoder. The motion encoder may be configured to generate a motion feature vector (e.g., within a latent space) using input data, such as navigational data and/or the vehicle-interoceptive sensor-data, and the motion decoder may be configured to generate suspected input data, such as suspected navigational data and/or suspected vehicle-interoceptive sensor-data using the feature vector. Various aspects may train the motion encoder and the motion decoder by reducing a loss determined by comparing the suspected input data with the input data.

Determining (e.g., generating) the motion data 426 (e.g., the motion feature vector) may be a first early fusion of the friction prediction model.

The friction prediction model 402 may include a wheel path model 428. The wheel path model 428 may describe a wheel path of the vehicle 100. For example, the wheel path model 428 may describe a wheel path of the vehicle 100 in a driving direction of the vehicle 100. The wheel path may be a predicted wheel path. For example, the wheel path model 428 may describe a wheel path of the vehicle 100 predicted for moving from a first position to a second position.

The wheel path model 428 may be configured to process the vehicle-interoceptive sensor-data. The wheel path model 428 may be configured to determine a wheel path 430, such as a predicted wheel path, using the vehicle-interoceptive sensor-data.

The wheel path model 428 may be configured to determine the wheel path 430 using the torque data and/or the turning/steering data. The wheel path 430 may include a wheel path for the one or more wheels of the vehicle 100, for example a first wheel path for left wheels and/or a right wheel path for right wheels, for example a wheel path for each wheel of the one or more wheels of the vehicle 100.

The determined wheel path 430 may include information to determine at each point (for example at each point in front of the vehicle 100 with respect to the driving direction) the relative distance along the wheel path and/or the relative distance perpendicular to the wheel path. The determined wheel path 430 may include explicit information and/or implicit information. The explicit information may include one or more vectors (e.g., vector functions) and others. The implicit information may include one or more Bezier curves and/or one or more B-spline curves and others.

The one or more processors 102 may be configured to determine, if a pixel of an image is within the wheel path 430 or not (e.g., the path $\sigma: N^2 \mapsto \{1, 0\}$). The one or more processors 102 may be further configured to determine a parallel distance along the path (e.g., $\varrho: N^2 \mapsto R$). The one or more processors 102 may be further configured to determine a perpendicular distance along the path (e.g., $\varsigma: N^2 \mapsto R$). The one or more processors 102 may be configured to determine an area of interest within an image (e.g., one or more pixels associated to an area of interest within an image) via determining, if a pixel is within the wheel path 430, determining the parallel distance along the path, and/or determining the perpendicular distance along the path. The one or more processors 102 may be configured to weight the one or more pixels within the wheel path using the parallel distance along the path. The one or more processors 102 may be configured to weight the one or more pixels within the wheel path using a kernel function. The kernel function may be $\zeta \odot \varrho : N^2 \mapsto (0,1] \in R^+$ (for example "0" may be at infinity). For example, pixels associated to a position closer to the vehicle 100 may have a higher weight than pixels associated to a position further away of the vehicle 100.

Determining the wheel path 430 may be a second early fusion of the friction prediction model.

The friction prediction model 402 may include a ground state model 432. The ground state model 432 may describe the state of the ground the vehicle 100 is driving on. For example, the state of the ground may include a temperature of the ground or near the ground, a type of the ground (e.g., a type of a road), a material the ground includes or the ground is composed of, a barometric pressure near the ground, a humidity of the ground or near the ground, a roughness of the ground and others.

The ground state model 432 may be configured to process ground state data. The ground state data may include the first ground condition data and/or the second ground condition data (e.g., the context data and/or the environmental data).

The ground state model 432 may be configured to determine (for example to generate) a ground state feature vector 434. The ground state model 432 may be configured to determine the ground state feature vector 434 using the first ground condition data and/or the second ground condition data.

The ground state model 432 may be further configured to process the determined wheel path 430. The ground state model 432 may be configured to determine the ground state feature vector 434 along the wheel path (e.g., predicted wheel path). The ground state model 432 may be configured to determine the ground state feature vector 434 along the wheel path using the determined wheel path 430 and the first ground condition data and/or the second ground condition data.

The friction prediction model 402 may include one or more segmentation models. A segmentation model may be configured to generate a segmentation image for an image. An image may include a plurality of pixels and a segmentation image may include a class of a plurality of classes assigned to each pixel of the plurality of pixels of the image.

The image acquisition devise 420 may include one or more visible-light camera sensors. The one or more visible-light camera sensors may be configured to provide one or more color images. Each color image of the one or more color images may include a plurality of pixels. The friction prediction model 402 may include a segmentation model. The segmentation model may be configured to generate a segmentation image for each color image of the one or more color images. Each segmentation image of the one or more segmentation images may include a class of a plurality of classes assigned to each pixel of the plurality of pixels of the respective color image. For example, one or more classes of the plurality of classes may include a type of the ground (e.g., a road type), such as concrete, asphalt, gravel, dirt, etc.

The ground state model 432 may be further configured to process the one or more segmentation images. The ground state model 432 may be configured to determine the ground state feature vector 434 using the one or more segmentation images. The ground state model 432 may be configured to determine the ground state feature vector 434 along the wheel path using the determined wheel path 430, the one or more generated segmentation images, and the first ground condition data and/or the second ground condition data.

According to various aspects of this disclosure, the one or more processors 102 may be configured to determine a distance-weighted histogram for an image. According to various aspects of this disclosure, the one or more processors 102 may be configured to determine one or more distance-weighted histograms for an image using the image and the determined wheel path 430. For example, the one or more processors 102 may be configured to determine one or more distance-weighted histograms for an image using the image and the (weighted) kernel function $\zeta \odot \varrho$.

The one or more processors 102 may be configured to process the one or more generated segmentation images and to determine for each segmentation image of the one or more segmentation images a distance-weighted class histogram for each class of the plurality of classes. For example, the one or more processors 102 may be configured to determine for each segmentation image of the plurality of segmentation images associated to a color image detected at a time t for each class, c, of the plurality of classes a distance-weighted class histogram, $H_c^t \mapsto R^k$, having k bins.

The second ground condition data may include one or more thermal images. The one or more processors 102 may be configured to process the one or more thermal images and to determine for each thermal image of the one or more thermal images a distance-weighted thermal histogram. For example, the one or more processors 102 may be configured to determine for each thermal image, T, of the plurality of thermal images detected at a time t a distance-weighted thermal histogram, $H_T^t \mapsto R^k$, having k bins.

The second ground condition data may include LIDAR data. The LIDAR data may include one or more reflectance maps. The one or more processors 102 may be configured to process the one or more reflectance maps and to determine for each reflectance map of the one or more reflectance maps a distance-weighted LIDAR histogram. For example, the one or more processors 102 may be configured to determine for each reflectance map, LR, of the plurality of reflectance maps detected at a time t a distance-weighted LIDAR histogram, $H_{LR}^t$.

The second ground condition data may include radar data. The radar data may include one or more absorption maps. The one or more processors 102 may be configured to process the one or more absorption maps and to determine for each absorption map of the one or more absorption maps a distance-weighted radar histogram. For example, the one or more processors 102 may be configured to determine for each absorption map, RA, of the plurality of absorption maps detected at a time t a distance-weighted radar histogram, $H_{RA}^t$.

The one or more processors 102 may be configured to determine a histogram vector using the one or more distance-weighted class histograms, $H_c^t$, the one or more distance-weighted thermal histograms, $H_T^t$, the one or more distance-weighted LIDAR histograms, $H_{LR}^t$, and/or the one or more distance-weighted radar histograms, $H_{RA}^t$, for example combining the one or more distance-weighted class histograms, $H_c^t$, the one or more distance-weighted thermal histograms, $H_T^t$, the one or more distance-weighted LIDAR histograms, $H_{LR}^t$, and/or the one or more distance-weighted radar histograms, $H_{RA}^t$.

As described above, the ground state model 432 may be configured to determine the ground state feature vector 434 along the wheel path using the determined wheel path 430 and the first ground condition data and/or the second ground condition data. According to various aspects of this disclosure, the ground state model 432 may be configured to determine (e.g., generate) the ground state feature vector 434 using the one or more distance-weighted class histograms, $H_c^t$, the one or more distance-weighted thermal histograms, $H_T^t$, the one or more distance-weighted LIDAR histograms, $H_{LR}^t$, the one or more distance-weighted radar histograms, $H_{RA}^t$, the environmental data, and/or the first ground condition data. For example, the ground state model 432 may be configured to determine the ground state feature vector 434 using the histogram vector, the environmental data, and/or the first ground condition data.

The ground state feature vector 434 may have a reduced dimensionality (e.g., within a latent space). The ground state feature vector 434 may include encoded information of the wheel path 430, the first ground condition data, and/or the second ground condition data. For example, the ground state feature vector 434 may include encoded information of the one or more distance-weighted class histograms, $H_c^t$, the one or more distance-weighted thermal histograms, $H_T^t$, the one or more distance-weighted LIDAR histograms, $H_{LR}^t$, and/or the one or more distance-weighted radar histograms, $H_{RA}^t$. For example, the ground state feature vector 434 may include encoded information of the histogram vector, of the environmental data, and/or of the first ground condition data.

The ground state model 432 may be or may include a neural network and the neural network may be configured to determine the ground state feature vector 434. The ground state model 432 may be or may include an encoder and the encoder may be configured to determine the ground state feature vector 434. The encoder (e.g. ground state encoder) may be configured to encode a histogram vector, environmental data, and/or first ground condition data. The ground state encoder may be a trained ground state encoder. The ground state encoder may have been trained using an autoencoder (e.g., ground state autoencoder). The ground state autoencoder may include the ground state encoder and a ground state decoder. The ground state encoder may be configured to generate a ground state feature vector (e.g., within a latent space) using input data, such as the histogram vector, and ground state decoder may be configured to generate suspected input data, such as a suspected histogram vector using the ground state feature vector. The ground state encoder and the ground state decoder may be trained by reducing a loss determined by comparing the suspected input data with the input data.

Determining (e.g., generating) the ground state feature vector 434 may be a third early fusion of the friction prediction model.

The friction prediction model 402 may include a friction model 436. The friction model 436 may describe a friction between a ground and one or more tires of a vehicle, such as the friction between the ground and the one or more tires of the vehicle 100. The friction model 436 may describe a friction between the ground and the one or more tires of the vehicle 100 for a ground state feature vector 434 and motion data 426 (e.g., a motion feature vector).

The friction model 436 may be configured to determine the one or more predictive friction coefficients 404. The friction model 436 may be or may include a neural network and the neural network may be configured to determine the one or more predictive friction coefficients 404. The friction model 436 may be configured to determine the one or more predictive friction coefficients 404 using the motion data 426 generated by the motion model 424 and/or the ground state feature vector 434 generated by the ground state model 432. The friction model 436 may be configured to determine a predictive friction coefficient, $\mu_i$, for each wheel i. For example, the friction model 436 may be configured to determine a predictive friction coefficient using sensor data detected (e.g., measured) at a time t. For example, the friction model 436 may be configured to determine a predictive friction coefficient, $\mu_i(t)$, for each wheel i using sensor data detected (e.g., measured) at a time t. For example, the friction model 436 may be configured to determine a predictive friction coefficient, $\mu_i(x, t)$ dependent of a location. The location may be the current position of the vehicle 100 and a predictive friction coefficient at the current position of the vehicle 100 may be a real-time (e.g. instantaneous) friction coefficient. The location may be a position in front of the vehicle 100 with respect to the driving direction and a predictive friction coefficient may be a friction coefficient predicted at the position in front of the vehicle 100. For example, the position in front of the vehicle 100 with respect to the driving direction may be a position located on the determined (e.g., predicted) wheel path 430 of the vehicle 100.

Determining the one or more predictive friction coefficients 404 may be a late fusion of the friction prediction model. The late fusion of the friction prediction model may include processing the output of the first early fusion, the output of the second early fusion, and/or the output of the third early fusion.

As described with respect to FIG. 3, the vehicle 100 may communicate with other vehicles. The vehicle 100 may transmit the determined one or more predicted friction coefficients 404 to one or more other vehicles. The vehicle 100 may receive one or more predicted friction coefficients determined by one or more other vehicles. The one or more processors 102 of the vehicle 100 may determine driving conditions based on (e.g., using) the received one or more predicted friction coefficients and the one or more processors 102 may be configured to provide control instructions to control the vehicle 100 to operate in accordance with the driving conditions.

Figure 5:
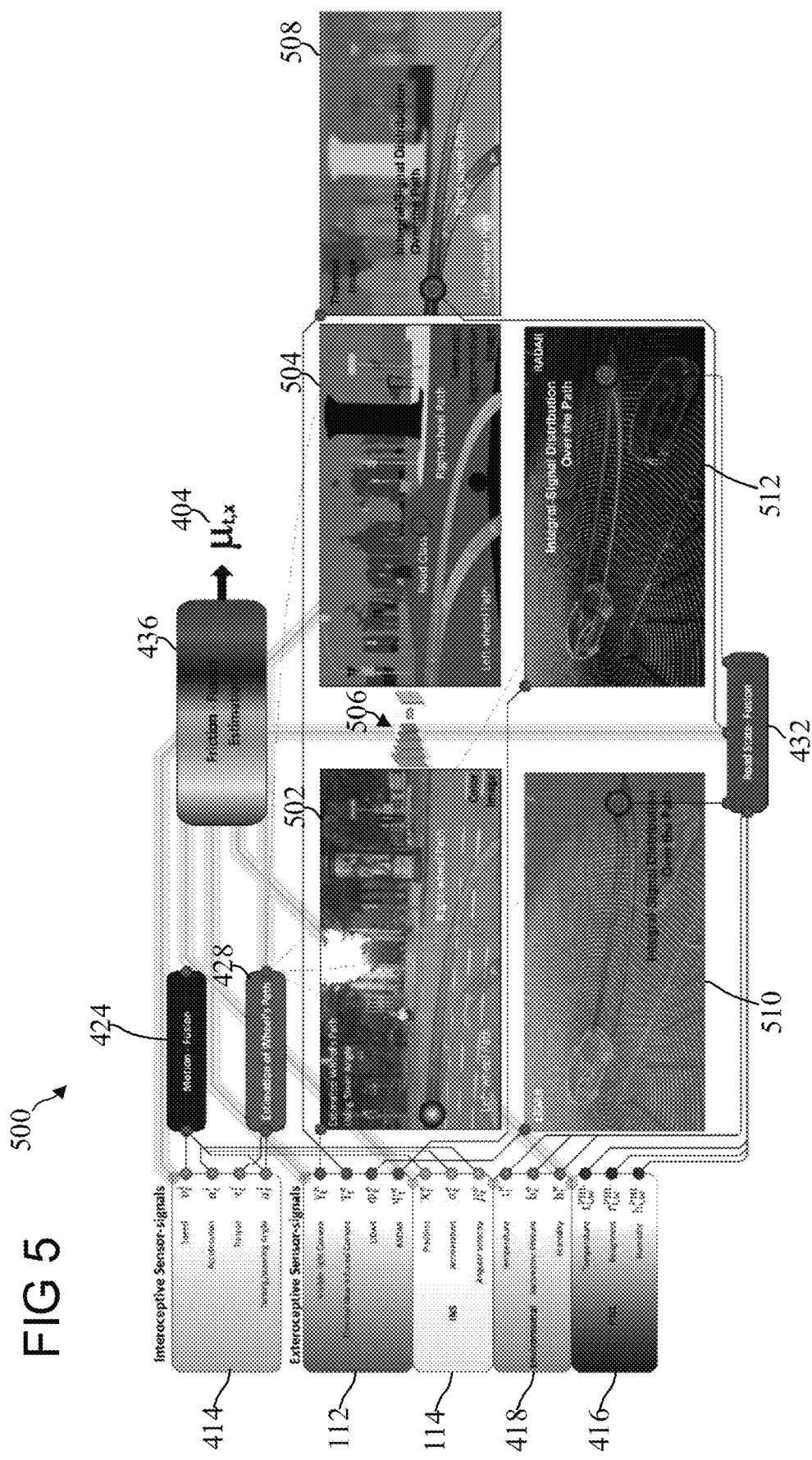
FIG. 5 shows an exemplary processing system with predictive friction determination in accordance with various aspects of the disclosure.

FIG. 5 shows an example of a processing system 500 in accordance with various aspects of the disclosure. The processing system 500 may be an exemplary configuration of the processing system 400.

The processing system 500 may include the one or more vehicle-interoceptive sensors 414 to provide the vehicle-interoceptive sensor-data. The one or more vehicle interoceptive sensors 414 may include one or more speed sensors, one or more acceleration sensors, one or more torque sensors, and/or one or more turning angle sensors and/or steering angle sensors.

The processing system 500 may include the one or more data acquisition devices 112 to provide the context data. The one or more data acquisition devices may include one or more visible-light camera sensors, one or more thermal-near-infrared camera sensors, one or more LIDAR sensors, and/or one or more radar sensors.

The processing system 500 may include the one or more position devices 114 to provide the navigational data. The one or more position devices 114 may include one or more position sensors, one or more acceleration sensors, and/or one or more angular velocity sensors.

The processing system 500 may include the one or more environmental sensors 418 to provide the navigational data. The one or more environmental sensors 418 may include one or more temperature sensors, one or more pressure sensors, and/or one or more humidity sensors.

The processing system 500 may include the one or more ground condition sensors 416 to provide the first ground condition data. The one or more ground condition sensors 416 may include one or more pyrometer, one or more line-distance meters, and/or one or more hygrometer.

The processing system 500 may include the motion model 424. The motion model 424 may be configured to provide motion data 426 using the speed data provided by the one or more speed sensors, the scalar acceleration data provided by the one or more acceleration sensors of the vehicle-interoceptive sensors 414, the position data provided by the one or more position sensors, the three-dimensional acceleration data provided by the one or more acceleration sensors of the position devices 114, and/or the angular velocity data provided by the one or more angular velocity sensors. The motion model 424 may be or may include the motion encoder.

The processing system 500 may include the wheel path model 428. The wheel path model 428 may be configured to determine a wheel path 430 (for example a predicted wheel path) using the torque data provided by the one or more torque sensors, and the turning/steering angle data provided by the one or more turning angle sensors and/or one or more steering angle sensors.

The processing system 500 may include a segmentation model 506 configured to generate a segmentation image for an image as described above.

The processing system 500 may include the ground state model 432. The ground may be a road, thus, the ground state may be a road state. The ground state model 432 may be configured to provide a ground state feature vector 434 using the one or more color images provided by the one or more visible-light camera sensors, the one or more thermal images provided by the one or more thermal-near-infrared camera sensors, the LIDAR data provided by the one or more LIDAR sensors, the radar data provided by the one or more radar sensors, the temperature data provided by the one or more temperature sensors of the environmental sensors 418, the barometric pressure data provided by the one or more pressure sensors, the humidity data provided by the one or more humidity sensors (e.g., one or more hygrometer) of the environmental sensors 418, the temperature data provided by the at least one pyrometer of the ground condition sensors 416, roughness data provided by the at least one line-distance meter, the humidity data provided by the at least one hygrometer of the ground condition sensors 416, the wheel path 430 determined by the wheel path model 428, and/or one or more segmentation images generated by the segmentation model 506.

An exemplary color image provided by the one or more visible-light camera sensors showing a determined wheel path 430 is illustratively shown in 502. The segmentation model 506 may be configured to generate a segmentation image 504 for the color image 502. The one or more processors 102 may be configured to determine a distance-weighted class histogram, $H_c^t$, using the segmentation image 504, as described above.

An exemplary thermal image provided by the one or more thermal camera sensors showing a determined wheel path 430 is illustratively shown in 508. The one or more processors 102 may be configured to determine a distance-weighted thermal histogram, $H_T^t$, using the thermal image 508, as described above.

An exemplary image of a reflectance map provided by the one or more LIDAR sensors showing a determined wheel path 430 is illustratively shown in 510. The one or more processors 102 may be configured to determine a distance-weighted LIDAR histogram, $H_{LR}^t$, using the reflectance map, as described above.

An exemplary image of an absorption map provided by the one or more radar sensors showing a determined wheel path 430 is illustratively shown in 512. The one or more processors 102 may be configured to determine a distance-weighted radar histogram, $H_{RA}^t$, using the absorption map, as described above.

The one or more processors 102 may be configured to determine a histogram vector using the distance-weighted class histogram, $H_c^t$, the distance-weighted thermal histogram, $H_T^t$, the distance-weighted LIDAR histogram, $H_{LR}^t$, and/or the distance-weighted radar histogram, $H_{RA}^t$, for example combining the distance-weighted class histogram, $H_c^t$, the distance-weighted thermal histogram, $H_T^t$, the distance-weighted LIDAR histogram, $H_{LR}^t$, and/or the distance-weighted radar histogram, $H_{RA}^t$.

The ground state model 432 may be configured to provide a ground state feature vector 434 using the histogram vector, the environmental data, and/or the first ground condition data.

The processing system 500 may include the friction model 436. The friction model 436 may be configured to determine one or more predictive friction coefficients 404 (e.g., $\mu_t(x, t)$) using the motion data 426 provided by the motion model 424, the wheel path 430 determined by the wheel path model 428, and/or the ground state feature vector 434 determined by the ground state model 432.

Figure 6:
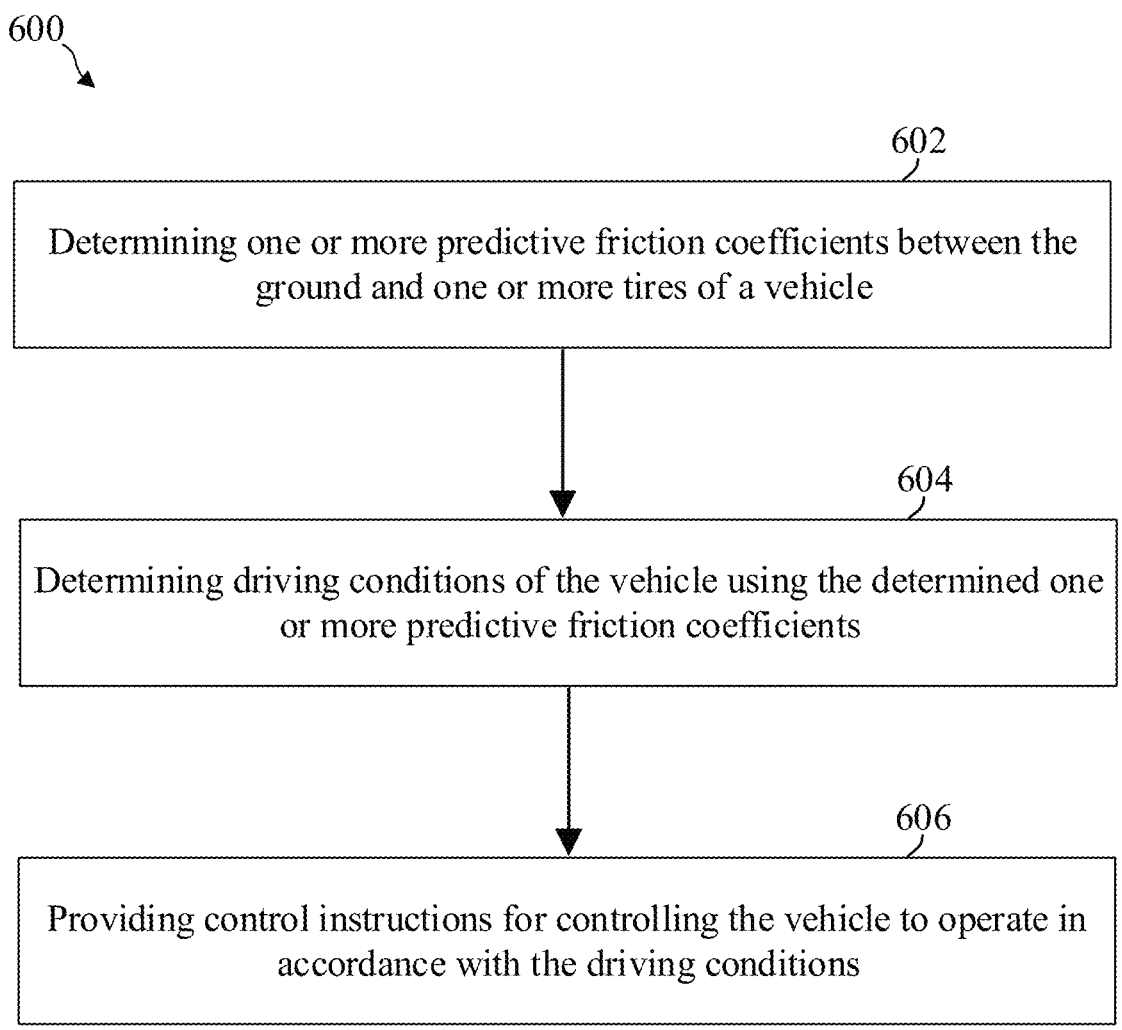
FIG. 6 shows an exemplary method of operating a safety system for a vehicle in accordance with various aspects of the disclosure.

FIG. 6 shows an exemplary method 600 of operating a safety system 200 for a vehicle (e.g., the vehicle 100) in accordance with various aspects of the disclosure. The safety system 200 may include the processing system 400, for example the processing system 500.

The method 600 may include determining one or more predictive friction coefficients between the ground and one or more tires of a vehicle, such as the vehicle 100 (in 602). The one or more predictive friction coefficients between the ground and one or more tires of the vehicle 100 may be determined based on a friction prediction model. The one or more predictive friction coefficients between the ground and one or more tires of the vehicle 100 may be determined based on a friction prediction model having first ground condition data and/or second ground condition data applied thereto. For example, the friction prediction model determines the one or more predictive friction coefficients using the first ground condition data and/or second ground condition data. The first ground condition data may represent conditions of the ground at or near the position of the vehicle 100. The second ground condition data may represent conditions of the ground in front of the vehicle 100 with respect to the driving direction of the vehicle 100.

The method 600 may include determining driving conditions of the vehicle 100 using the determined one or more predictive friction coefficients (in 604).

The method 600 may include providing control instructions for controlling the vehicle to operate in accordance with the driving conditions (in 606).

Figure 7:
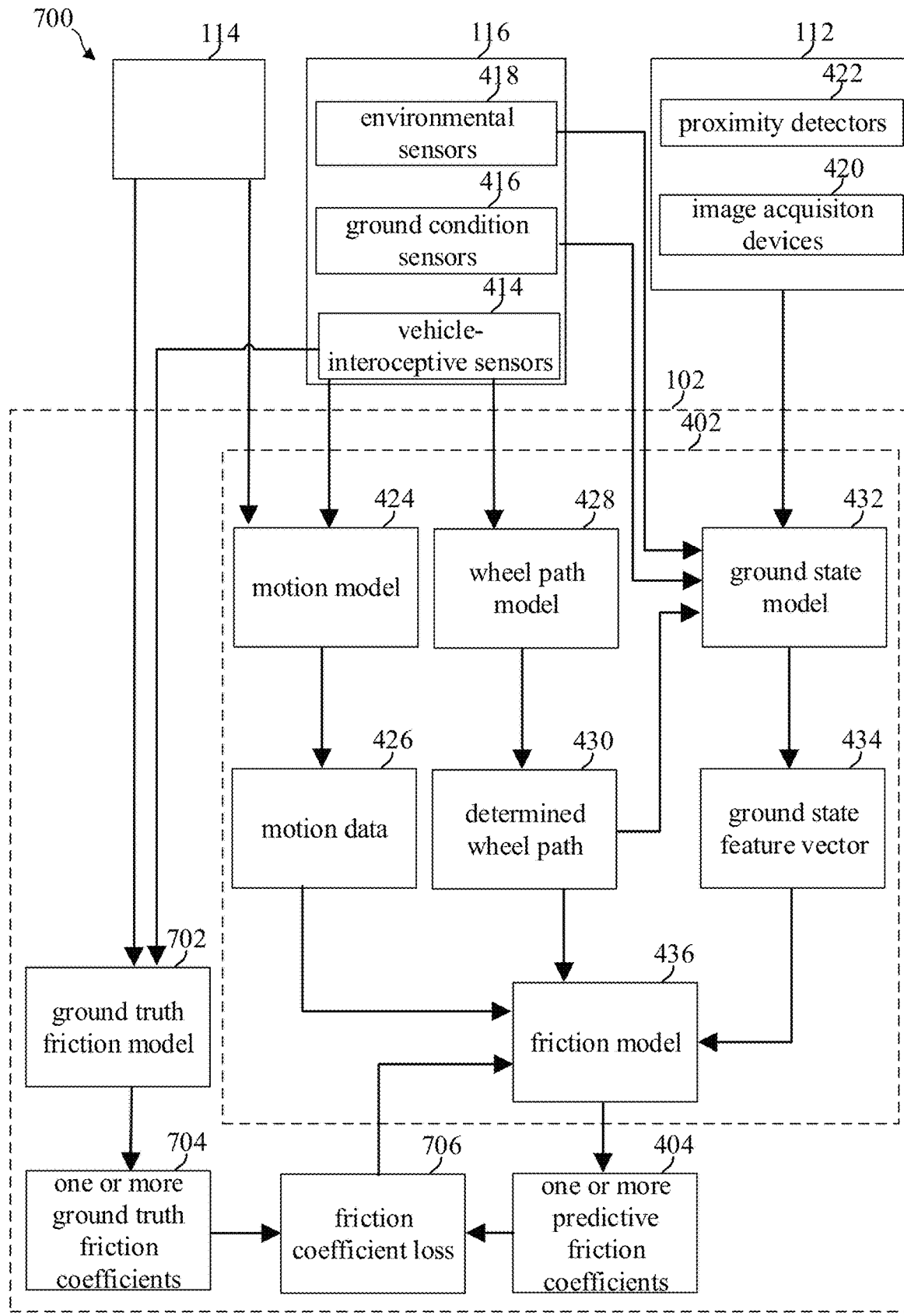
FIG. 7 shows an exemplary processing system for training a friction model, which determines a predictive friction, in accordance with various aspects of the disclosure.

FIG. 7 shows an example of a processing system 700 for training a friction model (e.g., the friction model 436) in accordance with various aspects of the disclosure.

The training of a friction model is exemplarily shown for the processing system 700 including the processing system 400, however, it should be noted that any other configuration of a processing system, which determines a predictive friction (e.g., one or more predictive friction coefficients) may be trained as described below.

The one or more processors 102 may be configured to implement a ground truth friction model 702. The ground truth friction model 702 may describe a friction between a vehicle and a ground for vehicle-specific parameters (e.g., parameters related to the braking dynamics of the vehicle). The ground truth friction model 702 may be configured to process the navigational data provided by the one or more position devices 114 and/or the vehicle-interoceptive sensor-data provided by the one or more vehicle-interoceptive sensors 414.

The navigational data and/or the vehicle-interoceptive sensor-data may be detected (e.g., measured) at a location, x, (e.g., described by the navigational data) at a time t. The ground truth friction model 702 may be configured to use the navigational data and/or the vehicle-interoceptive sensor-data to determine one or more ground truth friction coefficients 704. The ground truth friction model 702 may be configured to determine the one or more ground truth friction coefficients 704 at the current location of the vehicle 100. The ground truth friction model 702 may be configured to determine the one or more ground truth friction coefficients 704 at the current location of the vehicle 100 using the vehicle-interoceptive sensor-data provided by the one or more vehicle-interoceptive sensors 414. The ground truth friction model 702 may be configured to determine the one or more ground truth friction coefficients 704 at the current location of the vehicle 100 using the vehicle-interoceptive sensor-data provided by the one or more vehicle-interoceptive sensors 414 and to assign the respective location, x, to the one or more ground truth friction coefficients 704. The respective location, x, may be determined using the navigational data.

The ground truth friction model 702 may be configured to determine the one or more ground truth friction coefficients 704 based on braking dynamics of the vehicle 100, for example using vehicle-interoceptive sensor-data, such as at least one braking torque and at least one wheel speed. The ground truth friction model 702 may be configured to determine the one or more ground truth friction coefficients 704 based on a causal model. The ground truth friction model 702 may be configured to determine the one or more ground truth friction coefficients 704 based on a wheel slippage and/or based on vibrations (e.g., vibrations originating from the tire-ground interface). The vehicle-interoceptive sensor-data may include a load transfer of a front axle and/or a rear axle. The vehicle-interoceptive sensor-data may include a wheel speed and/or a braking torque (e.g., associated to each wheel of the one or more wheels of the vehicle 100). The vehicle-interoceptive sensor-data may include a mass of the vehicle 100, a longitudinal velocity of the vehicle 100, a braking torque of front wheels, a braking torque of rear wheels, a moment of inertia of front wheels, a moment of inertia of rear wheels, an angular speed of front wheels, a wheel slip (e.g., a front wheel longitudinal slip and/or a rear wheel longitudinal slip), an angular speed of rear wheels, and/or a wheel rolling radius, and others.

The ground truth friction model 702 may be further configured to determine the one or more ground truth friction coefficients 704 using ground condition information. The ground condition information may be determined using context data. For example, the ground condition information may be determined based on (e.g., using) a segmentation image generated for a color image. For example, the ground condition information may include a type of the ground and/or a material of the ground.

For example, the friction model 436 may be configured to determine one or more predictive friction coefficients, $\mu_i(x, t)$, for one or more wheels or tires, i, dependent of a location, x, at a time t.

The location may be the current position of the vehicle 100 and a predictive friction coefficient at the current position of the vehicle 100 may be a real-time (e.g. instantaneous) friction coefficient.

The location may be a position in front of the vehicle 100 with respect to the driving direction and a predictive friction coefficient may be a friction coefficient predicted at the position in front of the vehicle 100. For example, the position in front of the vehicle 100 with respect to the driving direction may be a position located on the determined (e.g., predicted) wheel path 430 of the vehicle 100.

Illustratively, the vehicle 100 may be configured to drive from a first position to a second position.

At the first position, the friction prediction model 402 may be configured to determine one or more predictive friction coefficients 404, $\mu_i(x, t)$. The one or more predictive friction coefficients 404 may be a friction coefficient predicted at a second position in front of the vehicle 100 with respect to the driving direction may be a position located on the determined (e.g., predicted) wheel path 430 of the vehicle 100.

At the second position, the one or more vehicle-interoceptive sensors 414 may be configured to provide vehicle-interoceptive sensor-data. The determine vehicle-interoceptive sensor-data may represent the conditions of the ground at the second position (e.g., related to braking dynamics of the vehicle 100). At the second position, the one or more position devices 114 may be configured to provide navigational data. The location, x, may be determined using the navigational data.

The ground truth friction model 702 may be configured to determine one or more ground truth friction coefficients 704, $\mu_{i,GT}(x, t)$. The ground truth friction model 702 may be configured to determine one or more ground truth friction coefficients 704, $\mu_{i,GT}(x, t)$ using the vehicle-interoceptive sensor-data at the second position.

The one or more processors 102 may be configured to compare the one or more predictive friction coefficients 404 with the associated one or more ground truth friction coefficients. For example, the one or more processors 102 may be configured to compare the one or more predictive friction coefficients 404 determined as predictive friction coefficients for the second position with the one or more ground truth friction coefficients 704 determined at the second position. The one or more processors 102 may be configured to determine a friction coefficient loss 706 based on the comparison of the one or more predictive friction coefficients 404 with the one or more ground truth friction coefficients 704. The one or more processors 102 may be configured to determine a friction coefficient loss 706 dependent of the location, x. For example, one or more processors 102 may be configured to determine a friction coefficient loss 706 at the second position.

The one or more processors 102 may be configured to train the friction model 436 based on the friction coefficient loss 706. For example, the one or more processors 102 may be configured to adjust the friction model 436 such that the friction coefficient loss 706 is reduced (for example minimized).

Figure 8:
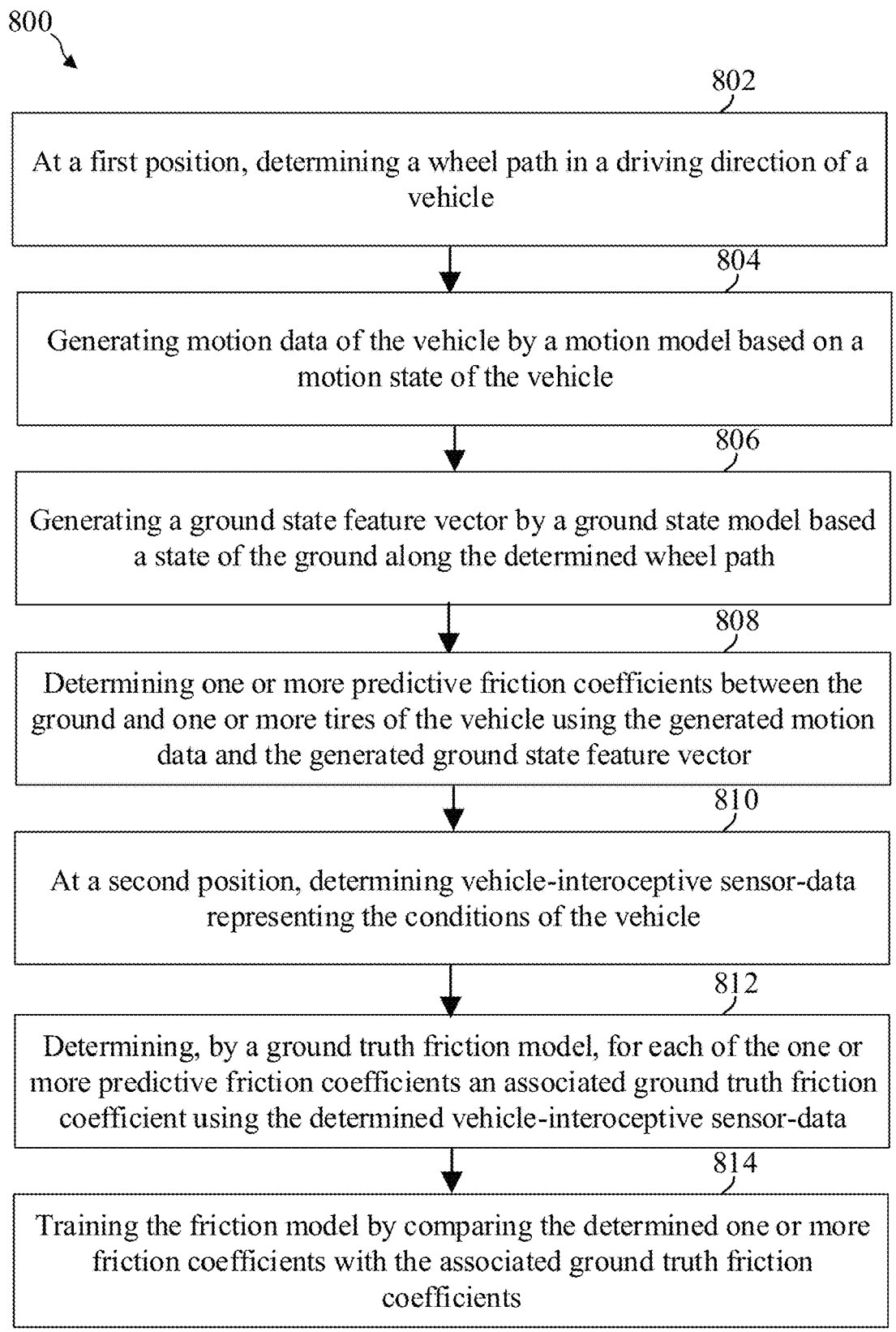
FIG. 8 shows an exemplary method of training a friction model to determine a predictive friction in accordance with various aspects of the disclosure.

FIG. 8 shows a method 800 of training a friction model in accordance with various aspects of this disclosure. The friction model may be included in a friction prediction model (e.g., the friction prediction model 402). The friction model may be a friction model included in a vehicle, such as the vehicle 100. The vehicle 100 may be configured to drive from a first position to a second position. The friction model may be part of the processing system 400, for example the processing system 500.

The method 800 may include, at a first position, determining a wheel path in a driving direction of a vehicle, e.g., vehicle 100 (in 802). The wheel path may be determined based on (e.g., using) at least one torque and/or at least one turning angle or steering angle of the vehicle.

The method 800 may include generating motion data of the vehicle by a motion model based on (e.g., using) navigational data (in 804). The motion model may describe the motion of a vehicle. The navigational data may represent an inertial navigation state of the vehicle. The generated motion data may represent a motion state of the vehicle. The generated motion data may be a motion feature vector.

The method 800 may include generating a ground state feature vector by a ground state model based on (e.g., using) ground state data (in 806). The ground state data may represent a state of the ground along the determined wheel path.

The method 800 may include determining one or more predictive friction coefficients between the ground and one or more tires of the vehicle using the generated motion data (e.g., the motion feature vector) and the generated ground state feature vector (in 808).

The method 800 may include, at a second position, determining vehicle-interoceptive sensor-data representing the conditions of the vehicle (in 810).

The method 800 may be a supervised or reference based training method. The method 800 may include determining, by a ground truth friction model, for each of the one or more predictive friction coefficients an associated ground truth friction coefficient using the determined vehicle-interoceptive sensor-data (in 812). The ground truth friction model may describe the friction between a vehicle and a ground for vehicle-specific parameters (e.g., parameters related to braking dynamics of the vehicle).

The method 800 may include training the friction model by comparing the determined one or more friction coefficients with the associated ground truth friction coefficients (in 814). The method 800 may include determining a friction coefficient loss based on (e.g., using) the comparison. The method 800 may include training the friction model based on (e.g., using) the friction coefficient loss.

The training may be performed in a predictive manner such that the vehicle 100 may be at a first position and the second positon may be in front of the vehicle 100 with respect to the driving direction.

The training may be performed real-time such that the first positon may correspond substantially to the second position.

According to various aspects of this disclosure, the vehicle 100 may include the processing system 400 (e.g., may include a safety system 200 including the processing system 400) for determining one or more predictive friction coefficients 404. Various aspects may train the friction model 436 continuously during operation (e.g., during driving). Various aspects train the friction model 436 using the training method 800.

An additional model may be provided. A friction model trained by the method 800 may generate training data (e.g., including one or more predictive friction coefficients), such as simulation data and/or synthetic data. The additional model may be trained using the generated training data (e.g., the generated one or more predictive friction coefficients).

In the following, various aspects of the present disclosure will be illustrated:

In Example 1 is a safety system for a ground vehicle. The safety system may include one or more processors. The one or more processors may be configured to use a friction prediction model to determine one or more predictive friction coefficients between the ground and one or more tires of the ground vehicle using first ground condition data and second ground condition data. The first ground condition data may represent conditions of the ground at or near the position of the ground vehicle. The second ground condition data may represent conditions of the ground in front of the ground vehicle with respect to a driving direction of the ground vehicle. The one or more processors may be further configured to determine driving conditions of the ground vehicle using the determined one or more predictive friction coefficients.

In Example 2, the subject matter of Example 1 can optionally include that the one or more processors may be further configured to provide control instructions to control the ground vehicle to operate in accordance with the determined driving conditions.

In Example 3, the subject matter of Example 1 or 2 can optionally include that the one or more predictive friction coefficients are friction coefficients between the one or more tires of the ground vehicle and the ground in front of the ground vehicle with respect to the driving direction of the ground vehicle.

In Example 4, the subject matter of any one of Examples 1 to 3 can optionally include that the one or more predictive friction coefficients represent a ratio of a force of friction between the ground and one or more tires of the ground vehicle.

In Example 5, the subject matter of any one of Examples 1 to 4 can optionally include that the one or more processors are configured to use the friction prediction model to determine one or more predictive friction coefficients for each tire of one or more tires of the ground vehicle.

In Example 6, the subject matter of any one of Examples 1 to 5 can optionally include that the determined one or more predictive friction coefficients associated to a tire of one or more tires of the ground vehicle represent friction coefficients between the ground and the respective tire.

In Example 7, the subject matter of any one of Examples 1 to 6 can optionally include that the ground vehicle includes left tires positioned on a left side of the ground vehicle and right tires positioned on the right side of the ground vehicle and that the one or more processors are configured to use the friction prediction model to determine one or more predictive friction coefficients for the left tires and one or more predictive friction coefficients for the right tires.

In Example 8, the subject matter of any one of Examples 1 to 7 can optionally include that the driving conditions include one or more of: a maximal acceleration during driving, a minimal acceleration during braking, and/or a maximal acceleration during braking.

In Example 9, the subject matter of any one of Examples 1 to 8 can optionally include that the one or more processors are configured to determine the maximal acceleration during driving, the minimal acceleration during braking, and/or the maximal acceleration during braking using the one or more predictive friction coefficients.

In Example 10, the subject matter of any one of Examples 1 to 9 can optionally include that the one or more processors are further configured to determine a minimal safety distance using the determined driving conditions, and to provide control instructions to control the ground vehicle to operate in accordance with the determined minimal safety distance.

In Example 11, the subject matter of any one of Examples 1 to 10 can optionally include that the safety system further includes a safety driving model configured to determine the driving conditions of the ground vehicle.

In Example 12, the subject matter of Examples 10 and 11 can optionally include that the safety driving model is further configured to determine the minimal safety distance.

In Example 13, the subject matter of Example 11 or 12 can optionally include that the safety driving model includes the friction prediction model.

In Example 14, the subject matter of any one of Examples 10 to 13 can optionally include that the minimal safety distance is a longitudinal distance and/or a lateral distance between the ground vehicle and another object.

In Example 15, the subject matter of Example 14 can optionally include that the object is another vehicle driven on the ground.

In Example 16, the subject matter of Example 15 can optionally include that the minimal safety distance is a longitudinal distance between the ground vehicle and the other vehicle, and that the other vehicle is driven along the same longitudinal direction as the ground vehicle or that the other vehicle is driven in an opposite longitudinal direction as the ground vehicle.

In Example 17, the subject matter of Example 16 can optionally include that the other vehicle is driven along the same longitudinal direction as the ground vehicle, and that the minimal safety distance is determined using a covered distance, a maximal acceleration during a response time of the ground vehicle, a minimal intensity braking distance and a maximal intensity braking distance.

In Example 18, the subject matter of Example 17 can optionally include that the minimal intensity braking distance represents a braking distance covered by a braking with a braking intensity for safe and comfortable driving experience.

In Example 19, the subject matter of Example 17 or 18 can optionally include that the maximal intensity braking distance represents a braking distance covered by a braking with a maximal braking intensity.

In Example 20, the subject matter of any one of Examples 17 to 19 can optionally include that the maximal braking intensity represents an emergency braking.

In Example 21, the subject matter of any one of Examples 17 to 20 can optionally include that the minimal intensity braking distance is determined using a velocity of the ground vehicle, a response time of the ground vehicle, the maximal acceleration during driving, and the minimal acceleration during braking.

In Example 22, the subject matter of any one of Examples 17 to 21 can optionally include that the maximal intensity braking distance is determined using a velocity of the other vehicle and a maximal braking intensity.

In Example 23, the subject matter of Example 16 can optionally include that the other vehicle is driven in an opposite longitudinal direction as the ground vehicle, and that the minimal safety distance is determined using a covered distance of the ground vehicle, a maximal acceleration during a response time of the ground vehicle, a minimal intensity braking distance of the ground vehicle, a covered distance of the other vehicle, a maximal acceleration during a response time of the other vehicle, and a minimal intensity braking distance of the other vehicle.

In Example 24, the subject matter of Example 15 can optionally include that the minimal safety distance is a lateral distance between the ground vehicle and the other vehicle, and that the minimal safety distance is determined using a covered lateral distance of the ground vehicle, a maximal lateral acceleration during a response time of the ground vehicle, a minimal intensity lateral braking distance of the ground vehicle, a covered lateral distance of the other vehicle, a maximal lateral acceleration during a response time of the other vehicle, and a minimal intensity lateral braking distance of the other vehicle.

In Example 25, the subject matter of any one of Examples 1 to 24 can optionally include that the first ground condition data include one or more of: a humidity of the ground, a temperature of the ground, and/or a roughness of the ground.

In Example 26, the subject matter of Example 25 can optionally include that the roughness of the ground is a micrometer roughness of the ground.

In Example 27, the subject matter of any one of Examples 1 to 26 can optionally include that the safety system further includes one or more ground condition sensors configured to provide the first ground condition data.

In Example 28, the subject matter of Examples 25 and 27 can optionally include that the first ground condition data include a humidity of the ground, and that the one or more ground condition sensors include a hygrometer configured to provide the humidity of the ground.

In Example 29, the subject matter of Examples 25 and 27 and optionally further of Example 26 can optionally include that the first ground condition data include a temperature of the ground, and that the one or more ground condition sensors include a pyrometer configured to provide the temperature of the ground.

In Example 30, the subject matter of Examples 25 and 27 and optionally further of Example 26 or 27 can optionally include that the ground condition data include a roughness of the ground, and that the one or more ground condition sensors include a line-distance meter configured to provide the roughness of the ground.

In Example 31, the subject matter Example 30 can optionally include that the line-distance meter is a laser-based line-distance meter.

In Example 32, the subject matter of any one of Examples 1 to 31 can optionally include that the second ground condition data include context data representing a surrounding of the ground vehicle.

In Example 33, the subject matter of Example 32 can optionally include that the context data include one or more of: image data and/or proximity data.

In Example 34, the subject matter of any one of Examples 1 to 33 can optionally include that the safety system further includes one or more data acquisition devices configured to provide the context data.

In Example 35, the subject matter of Examples 33 and 34 can optionally include that the context data include image data, and that the one or more data acquisition devices include one or more image acquisition device configured to provide the image data.

In Example 36, the subject matter of Example 35 can optionally include that the image data include one or more color images and that the one or more image acquisition device include one or more camera sensors of diverse wavelengths configured to provide the one or more color images.

In Example 37, the subject matter of Example 35 or 36 can optionally include that the image data include one or more thermal images and that the one or more image acquisition device include one or more thermal-near-infrared camera sensors configured to provide the one or more thermal images.

In Example 38, the subject matter of Examples 33 and 34 and optionally further of any one of Examples 35 to 37 can optionally include that the context data include proximity data, and that the one or more data acquisition devices include one or more proximity detectors configured to provide the proximity data.

In Example 39, the subject matter of Example 34 and optionally further of any one of Examples 35 to 38 can optionally include that the proximity data include LIDAR data and/or radar data.

In Example 40, the subject matter of Examples 38 and 39 can optionally include that the proximity data include LIDAR data, and that the one or more proximity detectors include one or more LIDAR sensors configured to provide the LIDAR data.

In Example 41, the subject matter of Examples 38 and 39 and optionally further of Example 40 can optionally include that the proximity data include radar data, and that the one or more proximity detectors include one or more radar sensors configured to provide the radar data.

In Example 42, the subject matter of any one of Examples 1 to 41 can optionally include that the second ground condition data include environmental data representing environmental conditions in the surrounding of the ground vehicle.

In Example 43, the subject matter of Example 42 can optionally include that the environmental data include one or more of: temperature data, barometric pressure data, and/or humidity data.

In Example 44, the subject matter of Example 42 or 43 can optionally include that the safety system further includes one or more environmental sensors configured to provide the environmental data.

In Example 45, the subject matter of Example 43 and 44 can optionally include that the one or more environmental sensors include one or more temperature sensors configured to provide the temperature data.

In Example 46, the subject matter of Examples 43 and 44 and optionally further of Example 45 can optionally include that the one or more environmental sensors include one or more pressure sensors configured to provide the barometric pressure data.

In Example 47, the subject matter of Examples 43 and 44 and optionally further of Example 45 or 46 can optionally include that the one or more environmental sensors include one or more humidity sensors configured to provide the humidity data.

In Example 48, the subject matter of any one of Examples 1 to 47 can optionally include that the one or more processors are configured to use the friction prediction model to determine one or more predictive friction coefficients between the ground and one or more tires of the ground vehicle using the first ground condition data, the second ground condition data, and navigational data. The navigational data may represent an inertial navigation state of the ground vehicle.

In Example 49, the subject matter of Example 48 can optionally include that the navigational data include one or more of: position data representing a position of the ground vehicle, three-dimensional acceleration data representing a three-dimensional acceleration of the ground vehicle, and/or angular velocity data representing an angular velocity of the ground vehicle.

In Example 50, the subject matter of Example 48 or 49 can optionally include that the safety system further includes one or more position devices configured to provide the navigational data.

In Example 51, the subject matter of Examples 49 and 50 can optionally include that the navigational data include position data, and that the one or more position devices include one or more position sensors configured to provide the position data.

In Example 52, the subject matter of Examples 49 and 50 and optionally further of Example 51 can optionally include that the navigational data include three-dimensional acceleration data, and that the one or more position devices include one or more acceleration sensor configured to provide three-dimensional acceleration data.

In Example 53, the subject matter of Examples 49 and 50 and optionally further of Example 51 or 52 can optionally include that the navigational data include angular velocity data, and that the one or more position devices include one or more angular velocity sensor configured to provide angular velocity data.

In Example 54, the subject matter of any one of Examples 48 to 53 can optionally include that the one or more processors are configured to use the friction prediction model to determine one or more predictive friction coefficients between the ground and one or more tires of the ground vehicle using the first ground condition data, the second ground condition data, the navigational data, and vehicle-interoceptive sensor-data. The ground vehicle-interoceptive sensor-data may represent the conditions of the ground vehicle.

In Example 55, the subject matter of Example 54 can optionally include that the ground vehicle-interoceptive sensor-data include one or more of: speed data representing a speed of the ground vehicle, scalar acceleration data representing a scalar acceleration of the ground vehicle, torque data representing a torque of the ground vehicle, turning/steering angle data representing a turning angle or a steering angle of the ground vehicle.

In Example 56, the subject matter of Example 55 can optionally include that the ground vehicle-interoceptive sensor-data include speed data, and that the safety system further includes one or more speed sensors configured to provide the speed data.

In Example 57, the subject matter of Example 55 or 56 can optionally include that the ground vehicle-interoceptive sensor-data include scalar acceleration data, and that the safety system further includes one or more acceleration sensors configured to provide the scalar acceleration data.

In Example 58, the subject matter of any one of Examples 55 to 57 can optionally include that the ground vehicle-interoceptive sensor-data include torque data, and that the safety system further includes one or more torque sensors configured to provide the torque data.

In Example 59, the subject matter of any one of Examples 55 to 57 can optionally include that the ground vehicle-interoceptive sensor-data include turning/steering angle data, and that the safety system further includes one or more turning/steering angle sensors configured to provide the turning/steering angle data.

In Example 60, the subject matter of any one of Examples 1 to 59 can optionally include that the friction prediction model includes a motion model describing the motion of a vehicle.

In Example 61, the subject matter of Examples 48 and 60 can optionally include that the motion model is configured to provide motion data of the ground vehicle using the navigational data. The motion data may represent a motion state of the ground vehicle.

In Example 62, the subject matter of Examples 54 and 61 can optionally include that the motion model is configured to provide motion data of the ground vehicle using the navigational data and the ground vehicle-interoceptive sensor-data of the ground vehicle.

In Example 63, the subject matter of Example 62 can optionally include that the motion data include a current position of the ground vehicle and/or an orientation of the ground vehicle.

In Example 64, the subject matter of Example 63 can optionally include that the current position of the ground vehicle includes a latitude position and a longitude position.

In Example 65, the subject matter of Example 63 or 64 can optionally include that the orientation of the ground vehicle includes an angle of the ground vehicle with respect to the north pole.

In Example 66, the subject matter of any one of Examples 1 to 65 can optionally include that the friction prediction model includes a wheel path model describing a path of the wheels.

In Example 67, the subject matter of Examples 54 and 66 can optionally include that the wheel path model is configured to determine a wheel path in a driving direction of the ground vehicle using the ground vehicle-interoceptive sensor-data of the ground vehicle.

In Example 68, the subject matter of Example 67 can optionally include that the ground vehicle-interoceptive sensor-data include the torque data and/or the turning/steering angle data.

In Example 69, the subject matter of any one of Examples 1 to 68 can optionally include that the friction prediction model includes a ground state model describing the state of the ground the ground vehicle is driving on.

In Example 70, the subject matter of Example 69 can optionally include that the ground state model is configured to generate a ground state feature vector using the first ground condition data and the second ground condition data.

In Example 71, the subject matter of Examples 67 and 70 can optionally include that the ground state model is configured to generate a ground state feature vector along the wheel path using the first ground condition data, the second ground condition data, and the determined wheel path.

In Example 72, the subject matter of any one of Examples 1 to 71 can optionally include that the safety system further includes one or more camera sensors of diverse wavelengths configured to provide one or more color images. The friction prediction model may further include a segmentation model configured to generate a segmentation image for each color image of the one or more color images. The color image may include a plurality of pixels and the segmentation image may include a class of a plurality of classes assigned to each pixel of the plurality of pixels.

In Example 73, the subject matter of Examples 71 and 72 can optionally include that the ground state model is configured to generate a ground state feature vector along the wheel path using the first ground condition data, the second ground condition data, the determined wheel path, and the one or more segmentation images.

In Example 74, the subject matter of Examples 61 and 70 and optionally further of any one of Examples 71 to 73 can optionally include that the friction prediction model includes a friction model describing the friction between the ground and one or more tires of the ground vehicle for a ground state feature vector and motion data.

In Example 75, the subject matter of Example 74 can optionally include that the friction model is configured to determine one or more predictive friction coefficients between the ground and one or more tires of the ground vehicle using the motion data generated by the motion model and the ground state feature vector generated by the ground state model.

In Example 76, the subject matter of Example 74 or 75 can optionally include that the friction prediction model includes a trained friction model, and that the friction model has been trained by a training method of a vehicle configured to drive from a first position to a second position. The training method may include at the first position: determining a wheel path in a driving direction of the ground vehicle using a torque and/or a turning/steering angle of the ground vehicle, a motion model describing the motion of a vehicle generating motion data of the ground vehicle using navigational data. The navigational data may represent an inertial navigation state of the ground vehicle, and the motion data may represent a motion state of the ground vehicle. The training method may further include at the first position: a ground state model generating a ground state feature vector for ground state data of the ground vehicle. The ground state data may represent a state of the ground along the wheel path. The training method may further include at the first position: the friction model determining one or more predictive friction coefficients between the ground and one or more tires of the ground vehicle at the second position using the generated motion data and the generated ground state feature vector. The training method may include at the second position: determining vehicle-interoceptive sensor-data representing the conditions of the ground vehicle, a ground truth friction model describing the friction between a vehicle and a ground for vehicle-specific parameters determining for each of the one or more predictive friction coefficients an associated ground truth friction coefficient using the determined vehicle-interoceptive sensor-data, and training the friction model by comparing the determined one or more predictive friction coefficients with the associated ground truth friction coefficients.

Example 77 is a method of computer-implemented training a friction model of a vehicle configured to drive from a first position to a second position. The method may include at the first position: determining a wheel path in a driving direction of the ground vehicle using a torque and/or a turning/steering angle of the ground vehicle, a motion model describing the motion of a vehicle generating motion data of the ground vehicle using navigational data. The navigational data may represent an inertial navigation state of the ground vehicle, and the motion data may represent a motion state of the ground vehicle. The method may include at the first position: a ground state model generating a ground state feature vector for ground state data of the ground vehicle. The ground state data may represent a state of the ground along the wheel path. The method may further include at the first position: the friction model determining one or more predictive friction coefficients between the ground and one or more tires of the ground vehicle at the second position using the generated motion data and the generated ground state feature vector. The method may include at the second position: determining vehicle-interoceptive sensor-data representing the conditions of the ground vehicle, a ground truth friction model describing the friction between a vehicle and a ground for vehicle-specific parameters determining for each of the one or more predictive friction coefficients an associated ground truth friction coefficient using the determined vehicle-interoceptive sensor-data, and training the friction model by comparing the determined one or more predictive friction coefficients with the associated ground truth friction coefficients.

Example 78 is a training system, configured to perform the method of Example 77.

Example 79 is a method of computer-implemented training an additional model. The method may include: training a friction model according to the method of Example 77, the trained friction model generating training data, training an additional model using the training data.

Example 80 is a device including an additional model trained by the method of Example 79.

Example 81 is a system including the device of Example 80.

Example 82 is a safety system server including one or more processors configured to: use a friction prediction model to determine one or more predictive friction coefficients between the ground and one or more tires of the ground vehicle using first ground condition data and second ground condition data. The first ground condition data may represent conditions of the ground at or near the position of the ground vehicle. The second ground condition data may represent conditions of the ground in front of the ground vehicle with respect to a driving direction of the ground vehicle. The one or more processors may be further configured to: determine driving conditions of the ground vehicle using the determined one or more predictive friction coefficients, and provide control instructions for controlling the ground vehicle to operate in accordance with the determined driving conditions.

In Example 83, the subject matter of Example 82 can optionally include that the one or more processors are further configured to: determine a minimal safety distance using the determined driving conditions, and provide control instructions for controlling the ground vehicle to operate in accordance with the determined minimal safety distance.

Example 84 is a method of operating a safety system for a vehicle including: using a friction prediction model to determine one or more predictive friction coefficients between the ground and one or more tires of the ground vehicle using first ground condition data and second ground condition data. The first ground condition data may represent conditions of the ground at or near the position of the ground vehicle. The second ground condition data may represent conditions of the ground in front of the ground vehicle with respect to a driving direction of the ground vehicle. The method may further include: determining driving conditions of the ground vehicle using the determined one or more predictive friction coefficients, and providing control instructions for controlling the ground vehicle to operate in accordance with the determined driving conditions.

Example 85 is a vehicle driving condition arrangement for determining driving conditions of an autonomous vehicle including a determiner configured to use a friction prediction model to determine one or more predictive friction coefficients between the ground and one or more tires of the ground vehicle using first ground condition data and second ground condition data. The first ground condition data may represent conditions of the ground at or near the position of the ground vehicle, and the second ground condition data may represent conditions of the ground in front of the ground vehicle with respect to a driving direction of the ground vehicle. The determiner may be further configured to determine driving conditions of the ground vehicle using the determined one or more predictive friction coefficients. The vehicle driving condition arrangement further includes an instruction selector configured to provide control instructions for controlling the ground vehicle to operate in accordance with the driving conditions.

Example 86 is a ground vehicle including a control system configured to control the ground vehicle to operate in accordance with provided control instructions and a safety system, including one or more processors configured to: use a friction prediction model to determine one or more predictive friction coefficients between the ground and one or more tires of the ground vehicle using first ground condition data and second ground condition data. The first ground condition data may represent conditions of the ground at or near the position of the ground vehicle, and the second ground condition data may represent conditions of the ground in front of the ground vehicle with respect to a driving direction of the ground vehicle. The one or more processors may be further configured to determine driving conditions of the ground vehicle using the determined one or more predictive friction coefficients and to provide control instructions for controlling the ground vehicle to operate in accordance with the determined driving conditions.

Example 87 is a computer program element including instructions which, when executed by one or more processors, cause the one or more processors to perform a method according to any one of Examples 77, 79 or 84.

Example 88 is a non-volatile computer-readable medium having instructions recorded thereon which, when executed by one or more processors, cause the one or more processors to perform a method according to any one of Examples 77, 79 or 84.

Example 89 is a non-transitory computer-readable medium having instructions recorded thereon which, when executed by one or more processors, cause the one or more processors to perform a method according to any one of Examples 77, 79 or 84.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented in a corresponding method. It is thus understood that a device corresponding to a method detailed herein may include one or more components configured to perform each aspect of the related method.

All acronyms defined in the above description additionally hold in all claims included herein.

What is claimed is:

1. A safety system for a ground vehicle, the safety system comprising:
one or more processors configured to:
use a friction prediction model to determine one or more predictive friction coefficients between the ground and one or more tires of the ground vehicle using first ground condition data and second ground condition data,
wherein the first ground condition data represents conditions of the ground at or near the position of the ground vehicle, and
wherein the second ground condition data represents conditions of the ground in front of the ground vehicle with respect to a driving direction of the ground vehicle;
determine driving conditions of the ground vehicle using the determined one or more predictive friction coefficients; and
provide control instructions to control the ground vehicle to operate in accordance with the determined driving conditions and a minimal safety distance.

2. The safety system of claim 1, wherein the minimal safety distance is a longitudinal distance and/or a lateral distance between the ground vehicle and another vehicle.

3. The safety system of claim 2, wherein the minimal safety distance is a longitudinal distance between the ground vehicle and the other vehicle, and wherein the other vehicle is driven along the same longitudinal direction as the ground vehicle or wherein the other vehicle is driven in an opposite longitudinal direction as the ground vehicle.

4. The safety system of claim 1, wherein the one or more predictive friction coefficients are friction coefficients between the one or more tires of the ground vehicle and the ground in front of the ground vehicle with respect to the driving direction of the ground vehicle.

5. The safety system of claim 4, wherein the one or more processors are configured to use the friction prediction model to determine one or more predictive friction coefficients for each tire of one or more tires of the ground vehicle.

6. The safety system of claim 1, wherein the first ground condition data comprise one or more of: a humidity of the ground, a temperature of the ground, and/or a roughness of the ground.

7. The safety system of claim 1, wherein the second ground condition data comprise context data representing a surrounding of the ground vehicle.

8. The safety system of claim 1, wherein the second ground condition data comprise environmental data representing environmental conditions in the surrounding of the ground vehicle.

9. The safety system of claim 1, wherein the one or more processors are configured to use the friction prediction model to determine one or more predictive friction coefficients between the ground and one or more tires of the ground vehicle using the first ground condition data, the second ground condition data, and navigational data, wherein the navigational data represent an inertial navigation state of the ground vehicle.

10. The safety system of claim 9, wherein the navigational data comprise one or more of: position data representing a position of the ground vehicle, three-dimensional acceleration data representing a three-dimensional acceleration of the ground vehicle, and/or angular velocity data representing an angular velocity of the ground vehicle.

11. The safety system of claim 9, wherein the friction prediction model comprises a motion model describing the motion of a vehicle, and wherein the motion model is configured to provide motion data of the ground vehicle using the navigational data, wherein the motion data represent a motion state of the ground vehicle.

12. The safety system of claim 9, wherein the one or more processors are configured to use the friction prediction model to determine one or more predictive friction coefficients between the ground and one or more tires of the ground vehicle using the first ground condition data, the second ground condition data, the navigational data, and vehicle-interoceptive sensor-data, wherein the ground vehicle-interoceptive sensor-data represent the conditions of the ground vehicle.

13. The safety system of claim 12, wherein the friction prediction model comprises a wheel path model describing a path of the wheels, and wherein the wheel path model is configured to determine a wheel path in a driving direction of the ground vehicle using the ground vehicle-interoceptive sensor-data of the ground vehicle.

14. The safety system of claim 13, wherein the friction prediction model comprises a ground state model describing the state of the ground the ground vehicle is driving on, wherein the ground state model is configured to generate a ground state feature vector along the wheel path using the first ground condition data, the second ground condition data, and the determined wheel path.

15. The safety system of claim 14, the safety system further comprising: one or more camera sensors of diverse wavelengths configured to provide one or more color images, wherein the friction prediction model further comprises a segmentation model configured to generate a segmentation image for each color image of the one or more color images, wherein the color image comprises a plurality of pixels and wherein the segmentation image comprises a class of a plurality of classes assigned to each pixel of the plurality of pixels, and wherein the ground state model is configured to generate a ground state feature vector along the wheel path using the first ground condition data, the second ground condition data, the determined wheel path, and the one or more segmentation images.

16. The safety system of claim 14, wherein the friction prediction model comprises a motion model describing the motion of a vehicle, wherein the motion model is configured to provide motion data of the ground vehicle using the navigational data, wherein the motion data represent a motion state of the ground vehicle, and wherein the friction prediction model comprises a friction model describing the friction between the ground and one or more tires of the ground vehicle for a ground state feature vector and motion data, and wherein the friction model is configured to determine one or more predictive friction coefficients between the ground and one or more tires of the ground vehicle using the motion data generated by the motion model and the ground state feature vector generated by the ground state model.

17. A ground vehicle, comprising:
a safety system, comprising one or more processors configured to:
use a friction prediction model to determine one or more predictive friction coefficients between the ground and one or more tires of the ground vehicle using first ground condition data and second ground condition data, wherein the first ground condition data represent conditions of the ground at or near the position of the ground vehicle, and wherein the second ground condition data represent conditions of the ground in front of the ground vehicle with respect to a driving direction of the ground vehicle,
determine driving conditions of the ground vehicle using the determined one or more predictive friction coefficients; and
provide control instructions for controlling the ground vehicle to operate in accordance with the determined driving conditions and a determined minimal safety distance; and
a control system configured to control the ground vehicle to operate in accordance with provided control instructions.

18. A non-transitory computer-readable medium having instructions recorded thereon which, when executed by one or more processors, cause the one or more processors to:
use a friction prediction model to determine one or more predictive friction coefficients between the ground and one or more tires of the ground vehicle using first ground condition data and second ground condition data, wherein the first ground condition data represent conditions of the ground at or near the position of the ground vehicle, and wherein the second ground condition data represent conditions of the ground in front of the ground vehicle with respect to a driving direction of the ground vehicle; determine driving conditions of the ground vehicle using the determined one or more predictive friction coefficients; and
provide control instructions for controlling the ground vehicle to operate in accordance with a determined driving conditions and the determined minimal safety distance.

* * * * *